(12) United States Patent
Ishizaka et al.

(10) Patent No.: US 8,244,114 B2
(45) Date of Patent: Aug. 14, 2012

(54) RECORDING APPARATUS AND RECORDING METHOD, PLAYBACK APPARATUS AND PLAYBACK METHOD, RECORDING/PLAYBACK APPARATUS AND RECORDING/PLAYBACK METHOD, AND PROGRAM

(75) Inventors: Toshihiro Ishizaka, Kanagawa (JP); Osamu Date, Tokyo (JP); Takuji Shimoda, Tokyo (JP); Takahito Seki, Tokyo (JP); Keiji Kanota, Kanagawa (JP); Makoto Yamada, Tokyo (JP)

(73) Assignee: Sony Corporation (JP)

( * ) Notice: Subject to any disclaimer, the term of this patent is extended or adjusted under 35 U.S.C. 154(b) by 1082 days.

(21) Appl. No.: 11/792,395

(22) PCT Filed: Nov. 14, 2005

(86) PCT No.: PCT/JP2005/020833
§ 371 (c)(1),
(2), (4) Date: Apr. 25, 2008

(87) PCT Pub. No.: WO2006/061972
PCT Pub. Date: Jun. 15, 2006

(65) Prior Publication Data
US 2009/0041430 A1  Feb. 12, 2009

(30) Foreign Application Priority Data
Dec. 6, 2004 (JP) .................. 2004-353383

(51) Int. Cl.
*H04N 5/93* (2006.01)
(52) U.S. Cl. ....................................... 386/353
(58) Field of Classification Search ............. 386/112
See application file for complete search history.

(56) References Cited

U.S. PATENT DOCUMENTS 5,899,581 A  5/1999  Kaamura et al.
(Continued)

FOREIGN PATENT DOCUMENTS

EP  1 457 921 A1  9/2004
(Continued)

OTHER PUBLICATIONS

Office Action from the Japanese Patent Office for JP-2004-353383 (Drafting date Jul. 14, 2010).

(Continued)

*Primary Examiner* — Jason Gee
(74) *Attorney, Agent, or Firm* — Finnegan, Henderson, Farabow, Garrett & Dunner, LLP

(57) ABSTRACT

The present invention relates to a recoding apparatus and a recording method, a playback apparatus and a playback method, a recording/playback apparatus and a recording/playback method, and a program, whereby processing relating to a file can be readily performed. With a video camera wherein with regard to H.264/AVC for example, which is a coding method arranged to encode or decode data, a codec class arranged to classify the performance of a codec configured to encode or decode data, and a codec level serving as a group of said one or more codec classes whose upper compatibility is ensured, are based on stipulated specifications, data is encoded into, for example, coded data of a codec class #2, for example, within a codec level AVC_A by H.264/AVC. The coded data is recorded in a recording medium, for example, as a file "AVCA0001.MP4" whose file name represents the codec level AVC_A of the coded data. The present invention can be applied to, for example, a video camera from which a recording medium can be detachable.

19 Claims, 10 Drawing Sheets

U.S. PATENT DOCUMENTS

| | | |
|---|---|---|
| 6,112,010 A | 8/2000 | Koyama et al. |
| 6,735,567 B2 * | 5/2004 | Gao et al. .................. 704/258 |
| 2005/0117885 A1 * | 6/2005 | Lee et al. .................. 386/95 |
| 2008/0027953 A1 * | 1/2008 | Morita et al. .................. 707/100 |

FOREIGN PATENT DOCUMENTS

| | | |
|---|---|---|
| JP | 8-234934 | 9/1996 |
| JP | 2001-331324 | 11/2001 |
| JP | 2002-218374 | 8/2002 |
| JP | 2004-062216 | 2/2004 |
| JP | 2004-62216 | 2/2004 |
| JP | 2004-96582 | 3/2004 |
| JP | 2004-120551 | 4/2004 |
| WO | WO-99/28911 | 6/1999 |
| WO | WO-03/042915 | 5/2003 |
| WO | WO-03/042915 A1 | 5/2003 |

OTHER PUBLICATIONS

Office Action from the European Patent Office for EP 05 80 5842 dated Oct. 11, 2011 in The Hague.

Office Action from the Japanese Patent Office for JP 2004-353383 dated Dec. 12, 2011.

* cited by examiner

FIG. 1

| AVC VIDEO FORMAT | AVC_Video6 | AVC_Video5 | AVC_Video4 | AVC_Video3 | AVC_Video2 | AVC_Video1 |
|---|---|---|---|---|---|---|
| Profile | high | high | main | main | baseline | baseline |
| Level | 4.2 | 4.1 | 4.0 | 3.0 | 3.0 | 1.2 |
| Picture Size | 1920×1080 | 1280×720 | 720×480 | 720×480 | 640×480 | 320×240 |
| Frame rate | 60i, 60p | 60i, 60p | 60i, 30p | 60i | 30p | 15p |
| Max Bit-rate | 50Mbps | 40Mbps | 15Mbps | 10Mbps | 8Mbps | 5Mbps |

| AVC AUDIO FORMAT | AVC_Audio4 | AVC_Audio3 | AVC_Audio2 | AVC_Audio1 |
|---|---|---|---|---|
| Profile | High Quality Audio | High Quality Audio | High Quality Audio | High Quality Audio |
| Level | 2.0 | 2.0 | 2.0 | 2.0 |
| Sampling Frequency [kHz] | 48 | 48 | 24 | 24 |
| Max Bit-rate [bps] | 256 | 128 | 64 | 48 |

FIG. 2

AVC LEVEL AND CLASS

| Codec Level | AVC_A | | AVC_B | | AVC_C | |
|---|---|---|---|---|---|---|
| Codec Class | 2 | 1 | 2 | 1 | 2 | 1 |
| AVC VIDEO FORMAT | AVC_Video6 | AVC_Video5 | AVC_Video4 | AVC_Video3 | AVC_Video2 | AVC_Video1 |
| AVC AUDIO FORMAT | AVC_Audio4 | AVC_Audio4 | AVC_Audio3 | AVC_Audio2 | AVC_Audio1 | AVC_Audio1 |

← PLAYBACK COMPATIBILITY

THERE IS NO RESTRICTION REGARDING A COMBINATION OF AVC_Video AND AVC_Audio.
HOWEVER, PLAYBACK COMPATIBILITY OF LOWER CLASSES IS ESSENTIAL WITHIN A LEVEL.

FIG. 3

MPEG4 LEVEL AND CLASS

| Codec Level | M4_A | | M4_B | | |
|---|---|---|---|---|---|
| Codec Class | 2 | 1 | 3 | 2 | 1 |

SIMILAR VIDEO AND AUDIO FORMATS ARE STIPULATED REGARDING MPEG4 AS WELL.

RECORDING APPARATUS AND RECORDING METHOD, PLAYBACK APPARATUS AND PLAYBACK METHOD, RECORDING/PLAYBACK APPARATUS AND RECORDING/PLAYBACK METHOD, AND PROGRAM

TECHNICAL FIELD

The present invention relates to a recording apparatus and a recording method, a playback apparatus and a playback method, a recording/playback apparatus and a recording/playback method, and a program, and particularly relates to a recording apparatus and a recording method, a playback apparatus and a playback method, a recording/playback apparatus and a recording/playback method, and a program, whereby processing relating to a file to be recorded in a recording medium can be readily performed, for example.

BACKGROUND ART

In recent years, for example, along with an increase in the capacity of recording media such as a memory cards employing nonvolatile memory, hard disks serving as magnetic disks, and so forth, the number of image files which can be recorded in a recording medium has increased markedly.

Now, in order to play a desired image file from many image files recorded in a recording medium, it is necessary to search the desired image file thereof, and the search time necessary for this search increases along with an increase in image files recorded in the recording medium.

Consequently, a management method of image files has been proposed wherein a directory is created on a recording medium based on a shooting date when an image of an image file was photographed, and the image file of the image photographed on the corresponding shooting date is stored in the directory thereof (e.g., see Patent Document 1).

According to this management method, a user can readily search a desired image based on a shooting date, and also can readily perform operations such as creating index images (thumbnails) in photographed order, and displaying these.

[Patent Document 1] Japanese Unexamined Patent Application Publication No. 2004-96582

DISCLOSURE OF INVENTION

Incidentally, as described in Patent Document 1, in the event that a directory is created based on a shooting date, the number of directories on a recording medium increases in a scattered manner, so along with the increase thereof, the load of processing relating to image files also increases.

That is to say, for example, in the event that a directory is created for each shooting date, and an image file of still images photographed on each shooting date is recorded in a directory corresponding to the shooting date on a recording medium, when displaying a list of the thumbnails of all the still images, it is necessary to search all the directories on the recording medium to find image files of still images.

Further, for example, with a recording/playback apparatus configured to perform recording and playback of an image file, different types of image files, i.e., for example, image files of images encoded with different coding methods are mixed in the directory created for each shooting date in some cases.

Specifically, in the event that a certain recording/playback apparatus includes, for example, a codec configured to perform JPEG (Joint Photographic Experts Group) encoding/decoding, and a codec configured to perform MPEG (Moving Picture Experts Group) 2 encoding/decoding, with the recording/playback apparatus thereof, an image file of still images JPEG-encoded, and an image file of moving images MPEG2-encoded are recorded in a recording medium in a mixed manner in some cases.

In the event that a recording medium is detachable from the recording/playback apparatus, with the recording/playback apparatus, an image file of still images JPEG-encoded, and an image file of moving images MPEG2-encoded are recorded in a recording medium in a mixed manner, following which the recording medium thereof is mounted on another recording/playback apparatus in some cases.

In this case, in the event that another recording/playback apparatus can play only an image file of still images JPEG-encoded, and when displaying a list of the thumbnails of playable image files, with another recording/playback apparatus, it is necessary to determine whether or not an image file to be played can be played, i.e., whether or not an image file to be played is an image file of still images JPEG-encoded, by checking the image files within all the directories on the recording medium mounted thereupon one at a time, and consequently it is necessary to spend a great amount of time for displaying the list of thumbnails.

Now, generally, the suffix of the file name of an image file of still images JPEG-encoded is "jpg", and also the suffix of the file name of an image file of a moving image MPEG2-encoded is "mpg", so in the event that an image file of still images JPEG-encoded, and an image file of a moving image MPEG2-encoded are only mixed on a recording medium, it can be determined whether or not a certain image file is an image file of still images JPEG-encoded, or an image file of a moving image MPEG2-encoded by referencing the suffix of the file name of the image file thereof.

However, even with a different type of image file, the same character string is employed as the suffix of the file name thereof in some cases. That is to say, for example, in the event that a moving image subjected to MPEG4 (MPEG4 Visual (MPEG4 part 2)) encoding, and a moving image subjected to AVC (MPEG4 part 10) (MPEG4 AVC (Advanced Video Coding)) encoding are stored in a file format conforming to ISO/IEC14496-part12, 14, and 15, generally, "MP4" is employed as the suffix of a file name as to both.

Accordingly, in the event that an image file of a moving image MPEG4-encoded, and an image file of a moving image AVC(H.264/AVC)-encoded are recorded in a recording medium in a mixed manner, simply referencing the suffix of the file name of an image file recorded in the recording medium makes it difficult to determine the type of the image file thereof, i.e., whether the image file thereof is an image file MPEG4-encoded or an image file AVC-encoded.

That is to say, in this case, it is necessary to actually open the image file thereof, and reference the management information of the image file thereof written in the image file.

In the event that a recording medium is mounted on a recording/playback apparatus, in order to display a list of the thumbnails of image files which the recording/playback apparatus can play of image files recorded in the recoding medium thereof, it is necessary to determine each of the types of all the image files recorded in the recording medium, and determine whether or not each of the image files is playable. Accordingly, in the event that a recording medium increases up to large capacity, and many image files are recorded in such a large-capacity recording medium, even if referencing the suffix of the file name of an image file, or even if referencing the management information of an image file, the load regarding processing wherein the type of an image file is determined, and determination is made whether or not the image file thereof is playable, and the amount of processing relating to the other image files becomes great.

The present invention has been made in light of such a situation, and it is an object of the present invention that even in the event of files being recorded in a large-capacity recording medium, processing relating to the files thereof can be readily performed.

A recording apparatus according to the present invention, which employs a coding method arranged to encode or decode data wherein a codec class arranged to classify the performance of a codec configured to encode or decode data, and a codec level serving as a group of the one or more codec classes whose upper compatibility is ensured, are based on the stipulated specifications, comprises: encoding means configured to encode data with the predetermined coding method into coded data of a predetermined codec class within a predetermined codec level; and recording control means configured to record the coded data encoded by the encoding means in a recording medium as a file whose file name represents the codec level of the coded data.

A recording method according to the present invention, which employs a coding method arranged to encode or decode data wherein a codec class arranged to classify the performance of a codec configured to encode or decode data, and a codec level serving as a group of the one or more codec classes whose upper compatibility is ensured, are based on the stipulated specifications, comprises: an encoding step arranged to encode data with the predetermined coding method into coded data of a predetermined codec class within a predetermined codec level; and a recording control step arranged to record the coded data encoded in the encoding step in a recording medium as a file whose file name represents the codec level of the coded data.

A first program according to the present invention, which employs a coding method arranged to encode or decode data wherein a codec class arranged to classify the performance of a codec configured to encode or decode data, and a codec level serving as a group of the one or more codec classes whose upper compatibility is ensured, are based on the stipulated specifications, comprises: an encoding step arranged to encode data with the predetermined coding method into coded data of a predetermined codec class within a predetermined codec level; and a recording control step arranged to record the coded data encoded in the encoding step in a recording medium as a file whose file name represents the codec level of the coded data.

A playback apparatus according to the present invention, which employs a coding method arranged to encode or decode data wherein a codec class arranged to classify the performance of a codec configured to encode or decode data, and a codec level serving as a group of the one or more codec classes whose upper compatibility is ensured, are based on the stipulated specifications, comprises: decoding means configured to decode coded data encoded with a predetermined codec class within a predetermined codec level with the predetermined coding method, and also enable coded data of a codec class having compatibility with the predetermined codec class to be decoded; codec-level determining means configured to determine the file of coded data of the predetermined codec level with which the decoding means are compatible based on a file name from files wherein the coded data of an optional codec class within an optional codec level is recorded in a recording medium as a file whose file name represents the codec level of the coded data thereof; and codec-class determining means configured to determine the file of coded data of a codec class which the decoding means can decode from files of coded data of the predetermined codec level with which the decoding means are compatible.

A playback method according to the present invention, which employs a coding method arranged to encode or decode data wherein a codec class arranged to classify the performance of a codec configured to encode or decode data, and a codec level serving as a group of the one or more codec classes whose upper compatibility is ensured, are based on the stipulated specifications, comprises: a decoding step arranged to cause decoding means to decode coded data, which are configured to decode coded data encoded with a predetermined codec class within a predetermined codec level with the predetermined coding method, and also enable coded data of a codec class having compatibility with the predetermined codec class to be decoded; a codec-level determining step arranged to determine the file of coded data of the predetermined codec level with which the decoding means are compatible based on a file name from files wherein the coded data of an optional codec class within an optional codec level is recorded in a recording medium as a file whose file name represents the codec level of the coded data thereof; and a codec-class determining step arranged to determine the file of coded data of a codec class which the decoding means can decode from files of coded data of the predetermined codec level with which the decoding means are compatible.

A second program according to the present invention, which employs a coding method arranged to encode or decode data wherein a codec class arranged to classify the performance of a codec configured to encode or decode data, and a codec level serving as a group of the one or more codec classes whose upper compatibility is ensured, are based on the stipulated specifications, comprises: a decoding step arranged to cause decoding means to decode coded data, which are configured to decode coded data encoded with a predetermined codec class within a predetermined codec level with the predetermined coding method, and also enable coded data of a codec class having compatibility with the predetermined codec class to be decoded; a codec-level determining step arranged to determine the file of coded data of the predetermined codec level with which the decoding means are compatible based on a file name from files wherein the coded data of an optional codec class within an optional codec level is recorded in a recording medium as a file whose file name represents the codec level of the coded data thereof; and a codec-class determining step arranged to determine the file of coded data of a codec class which the decoding means can decode from files of coded data of the predetermined codec level with which the decoding means are compatible.

A recording/playback apparatus according to the present invention, which employs a coding method arranged to encode or decode data wherein a codec class arranged to classify the performance of a codec configured to encode or decode data, and a codec level serving as a group of the one or more codec classes whose upper compatibility is ensured, are based on the stipulated specifications, comprises: codec means configured to encode data into coded data of a predetermined codec class within a predetermined codec level with the predetermined coding method, and also decode the coded data, and also enable coded data of a codec class having compatibility with the predetermined codec class to be decoded; recording control means configured to record the coded data encoded by the codec means in a recording medium as a file whose file name represents the codec level of the coded data thereof; codec-level determining means configured to determine the file of coded data of the predetermined codec level with which the codec means are compatible based on a file name from files recorded in the recording medium; and codec-class determining means configured to determine the file of coded data of a codec class which the codec means can decode from files of coded data of the predetermined codec level with which the codec means are compatible.

A recording/playback method according to the present invention, which employs a coding method arranged to encode or decode data wherein a codec class arranged to classify the performance of a codec configured to encode or decode data, and a codec level serving as a group of the one or more codec classes whose upper compatibility is ensured, are based on the stipulated specifications, comprises: a coding step arranged to cause codec means to encode data into decoded data of a predetermined codec class within a predetermined codec level with the predetermined coding method, and also decode the coded data, and also enable coded data of a codec class having compatibility with the predetermined codec class to be decoded; a recording control step arranged to record the coded data encoded by the codec means in a recording medium as a file whose file name represents the codec level of the coded data thereof; a codec-level determining step arranged to determine the file of coded data of the predetermined codec level with which the codec means are compatible based on a file name from files recorded in the recording medium; and a codec-class determining step arranged to determine the file of coded data of a codec class which the codec means can decode from files of coded data of the predetermined codec level with which the codec means are compatible.

A third program according to the present invention, which employs a coding method arranged to encode or decode data wherein a codec class arranged to classify the performance of a codec configured to encode or decode data, and a codec level serving as a group of the one or more codec classes whose upper compatibility is ensured, are based on the stipulated specifications, comprises: a coding step arranged to cause codec means to encode data into decoded data of a predetermined codec class within a predetermined codec level with the predetermined coding method, and also decode the coded data, and also enable coded data of a codec class having compatibility with the predetermined codec class to be decoded; a recording control step arranged to record the coded data encoded by the codec means in a recording medium as a file whose file name represents the codec level of the coded data thereof; a codec-level determining step arranged to determine the file of coded data of the predetermined codec level with which the codec means are compatible based on a file name from files recorded in the recording medium; and a codec-class determining step arranged to determine the file of coded data of a codec class which the codec means can decode from files of coded data of the predetermined codec level with which the codec means are compatible.

With the recording apparatus and recording method, and the first program according to the present invention, with regard to a coding method arranged to encode or decode data, a codec class arranged to classify the performance of a codec configured to encode or decode data, and a codec level serving as a group of the one or more codec classes whose upper compatibility is ensured, are based on the stipulated specifications, data is encoded with the predetermined coding method into coded data of a predetermined codec class within a predetermined codec level, and the coded data is recorded in a recording medium as a file whose file name represents the codec level of the coded data thereof.

With the playback apparatus and playback method, and the second program according to the present invention, with regard to a coding method arranged to encode or decode data, a codec class arranged to classify the performance of a codec configured to encode or decode data, and a codec level serving as a group of the one or more codec classes whose upper compatibility is ensured, are based on the stipulated specifications, and decoding means, which is configured to decode coded data encoded with a predetermined codec class within a predetermined codec level with the predetermined coding method, and also enable coded data of a codec class having compatibility with the predetermined codec class to be decoded, decode coded data. On the other hand, the file of coded data of the predetermined codec level with which the decoding means are compatible is determined based on a file name from files wherein the coded data of an optional codec class within an optional codec level is recorded in a recording medium as a file whose file name represents the codec level of the coded data thereof, and the file of coded data of a codec class which the decoding means can decode is determined from files of coded data of the predetermined codec level with which the decoding means are compatible.

With the recording/playback apparatus and recording/playback method, and the third program according to the present invention, with regard to a coding method arranged to encode or decode data, a codec class arranged to classify the performance of a codec configured to encode or decode data, and a codec level serving as a group of the one or more codec classes whose upper compatibility is ensured, are based on the stipulated specifications, and codec means, which is configured to encode data into decoded data of a predetermined codec class within a predetermined codec level with the predetermined coding method, and also decode the coded data, and also enable coded data of a codec class having compatibility with the predetermined codec class to be decoded, encode data into coded data, and the coded data is recorded in a recording medium as a file whose file name represents the codec level of the coded data thereof. On the other hand, the file of coded data of the predetermined codec level with which the decoding means are compatible is determined based on a file name from files recorded in the recording medium, and further the file of coded data of a codec class which the codec means can decode is determined from files of coded data of the predetermined codec level with which the codec means are compatible.

According to the present invention, processing relating to files recorded in a recording medium can be readily performed.

BRIEF DESCRIPTION OF THE DRAWINGS

FIG. 1 is a diagram showing each classification example of a video data format, and an audio data format conforming to AVC.

FIG. 2 is a diagram showing examples of codec levels and codec classes regarding AVC.

FIG. 3 is a diagram showing examples of codec levels and codec classes regarding MPEG4.

Figure 4:
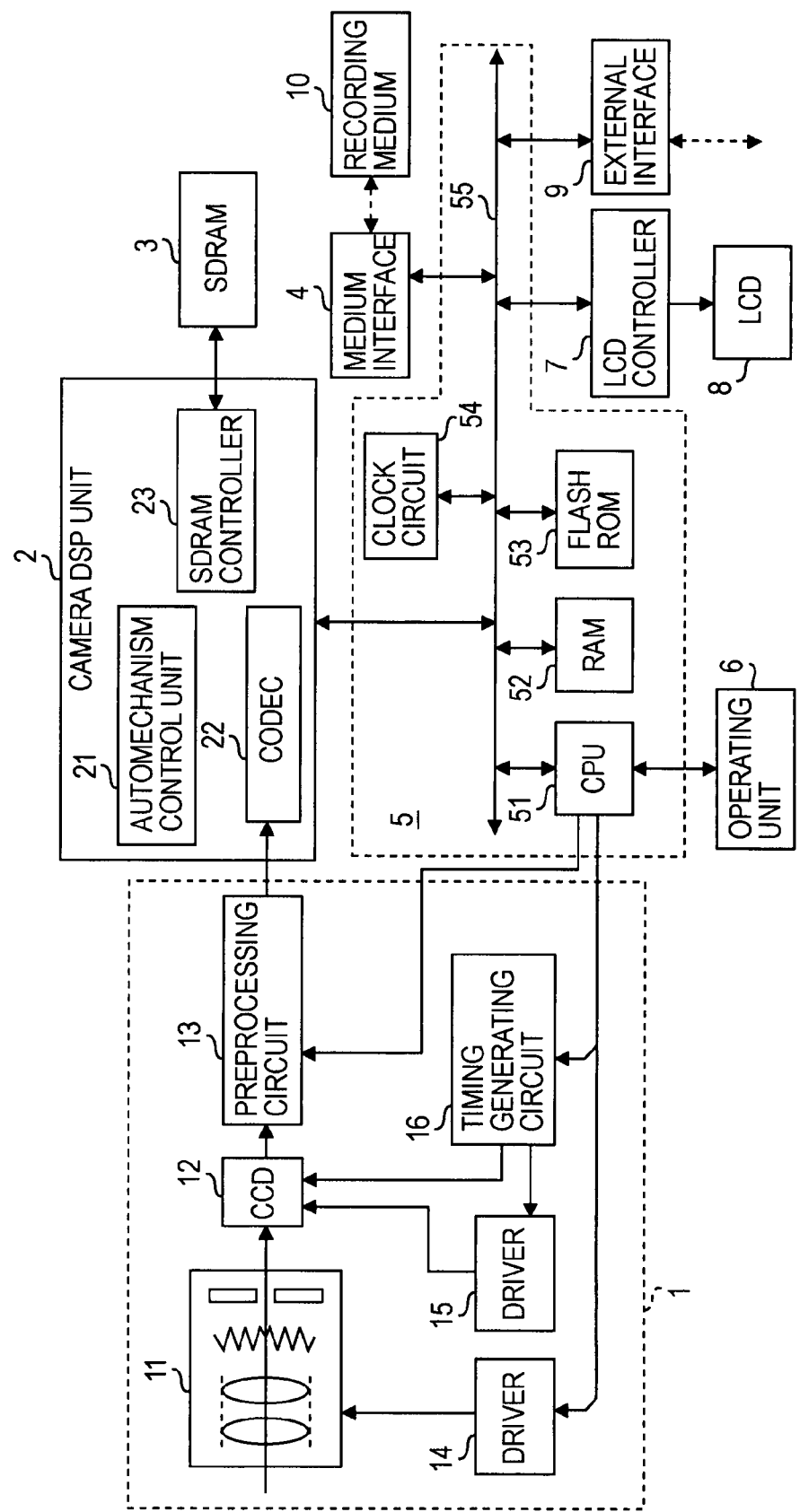
FIG. 4 is a block diagram illustrating a configuration example of one embodiment of a video camera to which the present invention is applied.

REFERENCE NUMERALS 1 camera unit
2 camera DSP unit
3 SDRAM
4 medium interface
5 control unit
6 operating unit
7 LCD controller
8 LCD
9 external interface
10 recording medium
11 optical block
12 CCD
13 pre-processing circuit
14, 15 driver
16 timing generating circuit
21 automechanism control unit
22 codec
23 SDRAM controller
51 CPU
52 RAM
53 flash ROM
54 clock circuit
55 system bus
101 network
102 video camera
103 computer
104 disc recorder
105 TV

BEST MODE FOR CARRYING OUT THE INVENTION

Description will be made below regarding an embodiment of the present invention with reference to the drawings.

Now, the present embodiment is premised on the existence of new specifications relating to an apparatus which encodes data into coded data, and stores this in a recording medium, or plays coded data recorded in a recording medium, i.e., reads out and decodes coded data (hereafter, referred to as new apparatus specifications as appropriate). Now, description will be made first regarding the new apparatus specifications.

With the new apparatus specifications, with regard to a coding method arranged to encode or decode data, a codec class arranged to classify the performance of a codec configured to encode or decode data, and a codec level serving as a group of the one or more codec classes whose upper compatibility is ensured are stipulated.

Now, let us say that moving image data including video data and audio data (moving image data with audio) is assumed as data, and also two types of AVC (H.264) and MPEG4 are assumed as a coding method arranged to encode or decode moving image data.

First, taking interest in AVC, with the new apparatus specifications, a codec class arranged to classify the performance of a codec configured to encode or decode moving image data with audio is stipulated.

Now, with AVC, a profile is defined wherein a group of components on an algorithm regarding encoding/decoding, or a group of tools (component technology) necessary for decoding data is stipulated. There are provided a baseline profile, a main profile, and an extended profile as the profiles defined with AVC.

The baseline profile is a profile made up of a combination between an AVC basic tool and an error-proof tool, for example, an application-oriented profile by which two-way communication in real time is requested, such as a so-called videophone and so forth.

With the main profile, a basic tool, and a high-efficiency coding tool whose coding efficiency is high are employed. The main profile is, for example, a broadcasting-media or accumulation-media oriented profile.

With the extended profile, a basic tool, a part of high-efficiency coding tool, and a streaming tool for streaming are employed. The extended profile is a so-called streaming application oriented profile.

With AVC, further, a level is stipulated, which represents a range supporting the tools stipulated by each profile of the baseline profile, main profile, and extended profile. The level stipulated with AVC corresponds to complexity of coded data (bit stream) which a decoder can decode, and with this level, many parameters relating to encoding (decoding) are stipulated. There are provided a max macro-block processing rate, which represents the number of macro blocks to be decoded for one second, and so forth as the parameters stipulated with the level of AVC.

The profiles of AVC can be regarded as a partial group of a group of the tools stipulated with AVC, and with an apparatus conforming to AVC, it is not necessary to implement all of the tools stipulated with AVC (may be implemented), it is sufficient to implement only the tool of a profile with which the apparatus thereof is compatible, whereby complexity of the apparatus (configuration of the apparatus, or processing performed by the apparatus) can be reduced.

The concept of such a profile is employed, for example, with MPEG2 and so forth as well as AVC. There are provided a simple profile, a main profile, and a high profile as the profiles defined with MPEG2, the simple profile is included in the main profile, and the main profile is included in the high profile.

Thus, the profiles of MPEG2 have an inclusive relation (hierarchical structure called as an onion ring) wherein the simple profile is included in the main profile, and the main profile is included in the high profile, so the coded data of the simple profile (data MPEG2-encoded in accordance with the simple profile) can be decoded by a decoder corresponding to any of the simple profile, main profile, and high profile. Also, the coded data of the main profile can be decoded by a decoder compatible with any of the main profile and high profile, of decoders conforming to MPEG2.

On the other hand, the profiles of AVC have no inclusive relation such as the profiles of MPEG2. Accordingly, even with apparatuses conforming to AVC, in the event that the compatible profiles differ, there is no compatibility (compatibility is not ensured). For example, data recorded in a recording medium at an apparatus compatible with only a certain profile of AVC fails to be played (can be played but not ensured) at an apparatus compatible with only another profile of AVC.

Consequently, with the new apparatus specifications, in order to secure compatibility between apparatuses, firstly, with regard to a coding method such as AVC and so forth, a codec class arranged to classify the performance of a codec configured to encode or decode moving image data is stipulated.

That is to say, for example, the performance of a codec conforming to AVC can be classified with the format of moving image data with audio which a codec can encode/decode, i.e., a video data format or an audio data format which a codec can encode/decode.

FIG. 1 shows a classification example of each of a video data format and an audio data format which are conforming to AVC.

The upper side of FIG. 1 shows a classification example of a video data format conforming to AVC, and the lower side of FIG. 1 shows a classification example of an audio data format conforming to AVC.

Six types of AVC video formats AVC_Video1, AVC_Video2, AVC_Video3, AVC_Video4, AVC_Video5, and AVC_Video6 are shown at the upper side of FIG. 1 as video data formats conforming to AVC (hereafter, referred to as AVC video formats as appropriate).

The AVC video format AVC_Video1 is compatible with the level 1.2 of the baseline profile of AVC (Profile is baseline, and Level is 1.2), and the picture size of video data is set to 320×240 pixels (lateral× vertical) (Picture Size is 320×240). Also, with the AVC video format AVC_Video1, video data is set to 15 p, i.e., data of a progressive method whose frame rate (vertical synchronization frequency) is 15 Hz (Frame Rate is 15 p), and the maximum bit rate is set to 5 Mbps (Max bit-rate is 5 Mbps).

The AVC video format AVC_Video2 is compatible with the level 3.0 of the baseline profile of AVC, and the picture size of video data is set to 640×480 pixels. Also, with the AVC video format AVC_Video2, video data is set to 30 p, i.e., data of a progressive method whose frame rate is 30 Hz, and the maximum bit rate is set to 8 Mbps.

The AVC video format AVC_Video3 is compatible with the level 3.0 of the main profile of AVC (Profile is main, and Level is 3.0), and the picture size of video data is set to 720×480 pixels. Also, with the AVC video format AVC_Video3, video data is set to 60 i, i.e., data of a interlaced method whose field rate (vertical synchronization frequency) is 60 Hz (Frame Rate is 60 i), and the maximum bit rate is set to 10 Mbps.

The AVC video format AVC_Video4 is compatible with the level 4.0 of the main profile of AVC, and the picture size of video data is set to 720×480 pixels. Also, with the AVC video format AVC_Video4, video data is set to 601 and 30 p, i.e., any one of data of a interlaced method whose field rate is 60 Hz and data of a progressive method whose frame rate is 30 Hz, and the maximum bit rate is set to 15 Mbps.

The AVC video format AVC_Video5 is compatible with the level 4.1 of the high profile of AVC (Profile is high, and Level is 4.1), and the picture size of video data is set to 1280×720 pixels. Also, with the AVC video format AVC_Video5, video data is set to 60 i and 60 p, i.e., any one of data of a interlaced method whose field rate is 60 Hz and data of a progressive method whose frame rate is 60 Hz, and the maximum bit rate is set to 40 Mbps.

Now with AVC, recently, in addition to the above-mentioned baseline profile, main profile, and extended profile, a high profile has been stipulated as the fourth profile. The high profile with which the AVC video format AVC_Video5 is compatible is the fourth profile thereof.

The AVC video format AVC_Video6 is compatible with the level 4.2 of the high profile of AVC, and the picture size of video data is set to 1920×1080 pixels. Also, with the AVC video format AVC_Video6, video data is set to any of 60 i and 60 p, and the maximum bit rate is set to 50 Mbps.

Note that the picture size (Picture Size), frame rate (Frame rate), and maximum bit rate (Max Bit-rate) of the AVC video formats shown in FIG. 1 are examples of the parameters relating to encoding, which are also stipulated with the level of AVC. The values of the picture size, frame rate, and maximum bit rate of an AVC video format shown in FIG. 1 are values within a range supported with the AVC level with which the AVC video format thereof is compatible, and in the event that the values of the picture size, frame rate, and maximum bit rate of an AVC video format shown in FIG. 1 are not identical to the values stipulated with the AVC level with which the AVC video format thereof is compatible, the values of the picture size, frame rate, and maximum bit rate of an AVC video format shown in FIG. 1 take priority over the values stipulated with the AVC level with which the AVC video format thereof is compatible.

That is to say, the level of AVC supports (covers) a lower level (small numerical level). Specifically, for example, in FIG. 1, the AVC video format AVC_Video5 is compatible with the level 4.1 of AVC, but with the level 4.1 of AVC, 50 Mbps is stipulated as the maximum bit rate. With the level smaller than the level 4.1 of AVC, the value of 50 Mbps or less is stipulated as the maximum bit rate, and thus, the level of AVC supports a lower level.

The AVC video format AVC_Video5 is compatible with the level 4.1 of AVC, so normally the maximum bit rate is 50 Mbps, but in some cases, there is the need to set to a different value other than the value stipulated with the level of AVC.

Consequently, with the new apparatus specifications, even in the case of a different value from the value stipulated with the level of AVC with which an AVC video format is compatible, such a different value is permitted as long as it is a value within a range supported with the AVC level thereof.

For example, as described above, in FIG. 1, the AVC video format AVC_Video5 is compatible with the level 4.1 of AVC by which 50 Mbps is stipulated as the maximum bit rate, but with the maximum bit rate (Max Bit-rate) column in FIG. 1, the maximum bit rate is set to 40 Mbps. The value of this 40 Mbps differs from 50 Mbps which is the maximum bit rate stipulated with the level 4.1 of AVC with which the AVC video format AVC_Video5 is compatible, but the 50 Mbps thereof is the value within the range supported, and in this case, 40 Mbps described in the maximum bit rate (Max Bit-rate) column takes priority over 50 Mbps serving as the maximum bit rate stipulated with the level 4.1 of AVC.

With the new apparatus specifications, with regard to the parameters (parameters relating to encoding) other than the maximum bit rate of an AVC video format as well, a value different from the value stipulated with the level of AVC can be employed as long as it is a value within a range supported with the level of AVC with which the AVC video format thereof is compatible. This can be also applied to later-described AVC audio formats.

Now, for example, the AVC video format AVC_Video6 in FIG. 1 is compatible with the level 4.2 of AVC, but with the level 4.2 of AVC, 2097152 pixels are stipulated as the picture size (referred to as maximum frame size (pixels) in AVC). The picture size (Picture Size) of the AVC video format AVC_Video6 in FIG. 1 is 1920×1080 (=2073600) pixels, which differs from 2097152 pixels, but is a value within a range of 2097152 pixels stipulated with the level 4.2 of AVC.

Note that with the new apparatus specifications, regarding the AVC video formats, the parameters other than the parameters (picture size, frame rate, and maximum bit rate) shown in FIG. 1 can be stipulated. This can be applied to AVC audio formats which will be described next.

Next, four types of AVC audio formats AVC_Audio1, AVC_Audio2, AVC_Audio3, and AVC_Audio4 are shown at the lower side of FIG. 1 as audio data formats conforming to AVC (hereafter, referred to as AVC audio format as appropriate).

All of the AVC audio formats AVC_Audio1, AVC_Audio2, AVC_Audio3, and AVC_Audio4 are compatible with the level 2.0 of a high quality audio profile of AVC (Profile is High Quality Audio, and Level is 2.0).

With the AVC audio format AVC_Audio1, the sampling frequency of audio data is set to 24 kHz (Sampling Frequency is 24), and the maximum bit rate is set to 48 kbps (Max Bit-rate is 48).

Also, with the AVC audio format AVC_Audio2, the sampling frequency of audio data is set to 24 kHz, and the maximum bit rate is set to 64 kbps. With the AVC audio format AVC_Audio3, the sampling frequency of audio data is set to 48 kHz, and the maximum bit rate is set to 128 kbps. Further, with the AVC audio format AVC_Audio4, the sampling frequency of audio data is set to 48 kHz, and the maximum bit rate is set to 256 kbps.

With the new apparatus specifications, for example, an optional one of the six types of AVC video formats AVC_Video1 through AVC_Video6 can be combined with an optional one of the four types of AVC audio formats AVC_Audio1 through AVC_Audio4, and this combination is one codec class regarding AVC.

That is to say, with the new apparatus specifications, for example, a combination between the AVC video format AVC_Video1 and the AVC audio format AVC_Audio1 can be set to one codec class. Also, with the new apparatus specifications, for example, a combination between the AVC video format AVC_Video2 and the AVC audio format AVC_Audio1 can be set to another codec class.

Note here that the moving image data with audio is set to an object, so a combination between a video data format and an audio data format has been set to a codec class, but for example, only a video data (moving image, still image) format, or only an audio data format can be set to a codec class, also, for example, a combination between a video data format, an audio data format, and a caption data format can be set to a codec class.

Next, with the new apparatus specifications, in order to secure compatibility between apparatuses, secondly, a codec level serving as a group of one or more codec classes whose upper compatibility is ensured is stipulated.

That is to say, a certain codec class is included in another codec class in some cases.

Specifically, for example, in FIG. 1, in the event that a combination between the AVC video format AVC_Video1 and the AVC audio format AVC_Audio1 is set to a codec class #1, and also a combination between the AVC video format AVC_Video2 and the AVC audio format AVC_Audio1 is set to a codec class #2, the AVC video format AVC_Video2 of the codec class #2 includes the AVC video format AVC_Video1 of the codec class #1.

Now, both of the AVC video format AVC_Video2 of the codec class #2, and the AVC video format AVC_Video1 of the codec class #1 are compatible with the baseline profile of AVC, so the type (e.g., entropy encoding is performed in AVC, and the type of the entropy encoding thereof (CABAC or CAVLC or the like in AVC)) of processing performed as to each of the data of the AVC video format AVC_Video2, and the data of the AVC video format AVC_Video1 is the same. Also, the value of a parameter such as the picture size or the like of the AVC video format AVC_Video1 is equal to or smaller than the value of the same type of parameter of the AVC video format AVC_Video2.

Accordingly, with between the AVC video formats AVC_Video2 and AVC_Video1, the type of processing performed as to data is the same, but the values of a parameter differ, i.e., the grades of processing only differ. With between the AVC video formats AVC_Video2 and AVC_Video1, the value of a parameter of the AVC video format AVC_Video1 is equal to or smaller than the value of the same type of parameter of the AVC video format AVC_Video2, and such a relation between the AVC video formats AVC_Video2 and AVC_Video1 is referred to as "the AVC video format AVC_Video2 encompasses the AVC video format AVC_Video1".

The AVC audio format of the codec classes #1 and #2 is the same AVC_Audio1.

Accordingly, in the event of comparing the whole of the codec classes #1 and #2, the codec class #2 includes the codec class #1, and in this case, a codec including performance capable of processing the data of the AVC video format AVC_Video2, and the data of the AVC audio format AVC_Video1 of the codec class #2 includes performance capable of processing the data of the AVC video format AVC_Video1, and the data of the AVC audio format AVC_Video1 of the codec class #1.

In other words, for example, if the CPU of a computer can operate with a reference clock of a certain frequency, aside from regarding whether or not a function arranged to operate the CPU thereof with a clock whose frequency is lower than that of the reference clock is installed in the computer, as with the CPU thereof including performance to operate with a clock whose frequency is lower than that of the reference clock, a codec including performance capable of processing the data of the AVC video format AVC_Video2 and the AVC audio format AVC_Audio1 of the codec class #2 includes the performance capable of processing the data of the AVC video format AVC_Video1, aside from regarding whether or not a function arranged to process the data of the AVC video format AVC_Video1 and the AVC audio format AVC_Audio1 of the codec class #1 has been actually installed.

Accordingly, in the event of a certain codec class encompassing another codec class, a codec including a function arranged to process the moving image data (video data and audio data) of the certain codec class can be required to install a function capable of processing the moving image data of another codec class. According to this requirement, if another codec class encompassed in a certain codec class is referred to as a lower codec class, and also a codec class encompassing a lower codec class is referred to as an upper codec class, upper compatibility between codec classes can be ensured.

Subsequently, with the new apparatus specifications, a group of codec classes whose upper compatibility is ensured is stipulated as a codec level.

Now, with the new apparatus specifications, in the event of a certain codec class encompassing another codec class, a codec having a function arranged to process the moving image data of a certain codec class can be required to install a function capable of processing the moving image data of another codec class, which only enables such a requirement to be stipulated in the case of a certain codec class encompassing another codec class, and accordingly, such a requirement is not indispensable.

Accordingly, even if a certain codec class encompasses another codec class, in the event that such a requirement is not stipulated, upper and lower relations are not caused between the two codec classes, and accordingly, upper compatibility is not ensured.

Also, with the new apparatus specifications, in the event of a group of codec classes whose upper compatibility is ensured, the group thereof can be only regarded as a codec level, which does not mean that it is necessary to set a group of codec classes whose compatibility is ensured to a codec level. The point is only that it is necessary to ensure upper compatibility between codec classes belonging to one codec level, but compatibility between a codec class belonging to a certain codec level, and a codec class belonging to another codec level is not ensured (there may or may be not be compatibility).

Accordingly, all of a plurality of codec classes whose compatibility is ensured can be regarded as one codec level, and also a part thereof and the rest thereof can be regarded as a separate codec level. Further, each of a plurality of codec classes whose compatibility is ensured can be regarded as a separate codec class.

Note that in order to realize the premise of a group of codec classes whose compatibility is ensured, it is necessary for the group of codec classes thereof to have a so-called serial inclusive relation. That is to say, for example, in order that first, second, and third codec classes belong to one codec level, the first codec class needs to be encompassed in the second codec class, and also the second codec class (accordingly, the first codec class as well) needs to be encompassed in the third codec class. Accordingly, for example, in the event that the first and second codec classes are encompassed in the third codec class, but one of the first and second codec classes is not encompassed in the other, the first through third codec classes are not allowed to belong to one codec level. However, in this case, the two of the first and third codec classes, or the two of the second and third codec classes are allowed to belong to one codec level.

Now, a codec level is a different concept from the level stipulated with AVC.

Also, an upper codec class requires complex encoding processing regarding picture size, image quality, the number of image types, and so forth, as compared with a lower codec class.

FIG. 2 shows examples of codec levels and codec classes regarding AVC.

In FIG. 2, the three of AVC_A, AVC_B, and AVC_C are stipulated as codec levels, and further two codec classes belong to each of the codec levels AVC_A, AVC_B, and AVC_C. Note here that the two codec classes which are the same number of codec classes belong to each of the three codec levels AVC_A through AVC_C, but the number of codec classes belonging to each of the three codec levels AVC_A through AVC_C is not restricted to two, and further the number of codec classes is not restricted to the same number.

Also, in FIG. 2, the two codec classes belonging to any of the codec levels AVC_A through AVC_C are indicated with labels #1 and #2, but a codec class belonging to a different codec level is a different codec class regardless of such a label.

Hereafter, let us say that a codec class is represented with a label indicating a codec level to which the codec class thereof belongs, and a label indicating the codec class thereof as appropriate. For example, let us say that the codec class #1 belonging to the codec level AVC_A is represented as AVC_Level#1A_Class#1 by employing a label "A" representing the codec level AVC_A, and a label "#1" representing the codec class #1.

Note that of codec classes belonging to the same codec level, a codec class having greater a number serving as a label indicating a codec class encompasses a codec class having smaller a number indicated with a label than that number. Accordingly, for example, in FIG. 2, with regard to codec classes #1 (AVC_Level#C_Class#1) and #2 (AVC_Level#C_Class#2) belonging to the codec level AVC_C, the codec class AVC_Level1#C_Class#2 encompasses the codec class AVC_Level1#C_Class#1.

In FIG. 2, codec classes AVC_Level1#A_Class#1 and AVC_Level1#A_Class#2 belong to the codec class AVC_A. The codec class AVC_Level1#A_Class#2 is a combination between the AVC video format AVC_Video6, and the AVC audio format AVC_Audio4, which have been described with FIG. 1, and the codec class AVC_Level1#A_Class#1 is a combination between the AVC video format AVC_Video5, and the AVC audio format AVC_Audio4. The codec class AVC_Level1#A_Class#2 is an upper codec class, the codec class AVC_Level1#A_Class#1 is a lower codec class, so with an apparatus capable of processing the data of the codec class AVC_Level1#A_Class#2, the processing of the data of the codec class AVC_Level1#A_Class#1 needs to be ensured.

Also, codec classes AVC_Level1#B_Class#1 and AVC_Level1#B_Class#2 belong to the codec class AVC_B. The codec class AVC_Level1#B_Class#2 is a combination between the AVC video format AVC_Video4, and the AVC audio format AVC_Audio3, and the codec class AVC_Level1#B_Class#1 is a combination between the AVC video format AVC_Video3, and the AVC audio format AVC_Audio2. The codec class AVC_Level1#B_Class#2 is an upper codec class, the codec class AVC_Level1#B_Class#1 is a lower codec class, so with an apparatus capable of processing the data of the codec class AVC_Level1#B_Class#2, the processing of the data of the codec class AVC_Level1#B_Class#1 needs to be ensured.

Further, the codec classes AVC_Level1#C_Class#1 and AVC_Level1#C_Class#2 belong to the codec class AVC_C. The codec class AVC_Level1#C_Class#2 is a combination between the AVC video format AVC_Video2, and the AVC audio format AVC_Audio1, and the codec class AVC_Level1#C_Class#1 is a combination between the AVC video format AVC_Video1, and the AVC audio format AVC_Audio1. The codec class AVC_Level1#C_Class#2 is an upper codec class, the codec class AVC_Level1#C_Class#1 is a lower codec class, so with an apparatus capable of processing the data of the codec class AVC_Level1#C_Class#2, the processing of the data of the codec class AVC_Level1#C_Class#1 needs to be ensured.

Note that with the present embodiment, a codec capable (including a function) of processing the data of an upper codec class belonging to a certain codec level is required to process (install a function capable of processing) the data of a lower codec class belonging to the codec level thereof, but processing subjected to this requirement may be all of the processing of the codec, i.e., not only both of encoding and decoding but also only decoding. In this case, with a codec capable of decoding the data of an upper codec class belonging to a certain codec level, decoding of the data of a lower codec class belonging to the codec level thereof is ensured.

As described above, a codec level needs to satisfy a condition of a group of codec classes whose upper compatibility is ensured, and it is optional to impose the other conditions which are not contrary to the condition thereof.

That is to say, a codec level can be stipulated, for example, by application of an apparatus (recording/playback apparatus), which includes a codec, configured to perform recording or playback of data.

Specifically, for example, a certain codec level can be stipulated as a group of one or more codec classes whose upper compatibility is ensured, which can handle a great picture size (image size), handle any one of interlaced and progressive scan methods, and handle any entropy encoding of CABAC (Context-based Adaptive Binary Arithmetic Code) of complex but high encoding performance, and simple but CAVLC (Context-based Adaptive Variable Length Code) of encoding performance of a certain level. Such a codec level can be stipulated as an application arranged to display a high-image-quality HD (High Definition) image, for so-called HD compatible equipment.

Further, another codec level can be stipulated as a group of one or more codec classes whose upper compatibility is ensured, which can handle a middle (not great but not small) picture size, handle any one of interlaced and progressive scan methods, and handle any entropy encoding of CABAC and CAVLC. Such a codec level can be stipulated as an application arranged to display a standard-image-quality SD (Standard Definition) image, for so-called SD compatible equipment.

Also, yet another codec level can be stipulated as a group of one or more codec classes whose upper compatibility is ensured, which can handle a small picture size, handle only the progressive scan method, and handle only CAVLC. Such a codec level can be stipulated as an application for so-called mobile equipment, which is not allowed to employ a great display screen since portability is thought as important.

Note that a codec level can be also stipulated by the category of a recording/playback apparatus, i.e., an application for a moving image apparatus (e.g., hard disc recorder) configured to perform recording and playback of a moving image including audio, or an audio apparatus (e.g., MD (Mini Disc) (registered trademark)) configured to perform recording and playback of audio (voice).

The codec level shown in FIG. 2 is stipulated by an application of a recording/playback apparatus. That is to say, in FIG. 2, the codec level AVC_A is an application for HD compatible equipment, and the codec level AVC_B is an application for SD compatible equipment. Also, the codec level AVC_C is an application for mobile equipment.

Accordingly, the HD compatible equipment conforming to the new apparatus specifications in FIG. 2 needs to be compatible with the codec level AVC_A, and the SD compatible equipment conforming to the new apparatus specifications in FIG. 2 needs to be compatible with the codec level AVC_B. Also, the mobile equipment conforming to the new apparatus specifications in FIG. 2 needs to be compatible with the codec level AVC_C.

However, the codec classes AVC_Level#A_Class#1 and AVC_Level#A_Class#2 belong to the codec level AVC_A as described above, of the HD compatible equipment conforming to the new apparatus specifications in FIG. 2, the HD compatible equipment required for the specifications compatible with the codec class AVC_Level#A_Class#2 needs to be compatible with the codec class AVC_Level#A_Class#2 (function capable of processing the data of the codec class AVC_Level#A_Class#2 is required), but the HD compatible equipment not required for the specifications compatible with the codec class AVC_Level#A_Class#2 needs to be compatible with the codec class AVC_Level#A_Class#1, and does not need to be compatible with the codec class AVC_Level#A_Class#2. This can be applied to the SD compatible equipment and mobile equipment conforming to the new apparatus specifications in FIG. 2.

The recording/playback apparatus conforming to the new apparatus specifications needs to be compatible with any codec class within (belonging to) any codec level stipulated with the new apparatus specifications, so compatibility between the recording/playback apparatuses compatible with the same codec class of the same codec level can be ensured.

Further, the recording/playback apparatus compatible with any codec class within any codec level stipulated with the new apparatus specifications needs to be compatible with a lower codec class of the compatible codec class belonging to the codec level thereof (needs to include a function capable of processing the data of a lower codec class), so upper compatibility is ensured wherein a recording/playback apparatus compatible with a certain codec level can process the data of lower a codec level than the codec level thereof.

Specifically, of the recording/playback apparatuses conforming to the new apparatus specifications, for example, the recording/playback apparatus compatible with the codec class AVC_Level#A_Class#2 belonging to the codec level AVC_A can play the data of the codec class AVC_Level#A_Class#2 thereof, and further can play the data of the lower codec class AVC_Level#A_Class#1, i.e., has upper compatibility.

However, the recording/playback apparatus compatible with the codec class AVC_Level#A_Class#2 belonging to the codec level AVC_A does not need to have compatibility exceeding the compatible codec level AVC_A. That is to say, with the new apparatus specifications, the recording/playback apparatus compatible with the codec class AVC_Level#A_Class#2 belonging to the codec level AVC_A is not required of processing the data of a codec class belonging to the codec level AVC_B or AVC_C other than the compatible codec level AVC_A.

This is, for example, as described above, because in the event that a codec level is stipulated by an application of the recording/playback apparatus, it is not realistic to require processing of the data of a codec class belonging to the codec level AVC_B for SD compatible equipment, or the codec level AVC_C for mobile equipment from the HD compatible equipment serving as the target of the codec level AVC_A, and also requests for such a demand are not frequent.

Note that it is permitted (free) for the recording/playback apparatus to be compatible with a plurality of codec levels. That is to say, for example, it is permitted for the recording/playback apparatus to be compatible with the codec class AVC_Level#A_Class#2 belonging to the codec level AVC_A, and also compatible with the codec class AVC_Level#B_Class#2 belonging to the codec level AVC_B. However, the recording/playback apparatus needs to process the data of the lower codec class AVC_Level#A_Class#1 of the codec class AVC_Level#A_Class#2, and the data of the lower codec class AVC_Level#B_Class#1 of the codec class AVC_Level#B_Class#2 as well as the data of the codec class AVC_Level#A_Class#2 belonging to the codec level AVC_A, and the data of the codec class AVC_Level#B_Class#2 belonging to the codec level AVC_B.

According to the new apparatus specifications thus described, for example, in the event that recoding or playback of data as to a detachable recording medium is performed with a recording/playback apparatus, even if the recording medium is cyclically used between recording/playback apparatuses compatible with the same codec level, the data recorded in the recording medium at a recording/playback apparatus compatible with a lower codec class can be of course played with a recording/playback apparatus compatible with the same codec class, and also can be always played at a recording/playback apparatus compatible with a upper codec class.

Further, with the new apparatus specifications, upgrading of a codec class or a codec level can be handled easily.

That is to say, as described above, a codec class is a concept arranged to classify the performance of a codec, and a codec level is a group of one or more codec classes whose upper compatibility is ensured, so for example, with the new apparatus specifications, in the event of stipulating a new codec class, the codec levels other than the codec level to which the codec class thereof belongs are not affected.

Accordingly, for example, as shown in FIG. 2, in the event that the three codec levels AVC_A, AVC_B, and AVC_C have been already stipulated, when making a new codec class belong to any codec level thereof, it is necessary to stipulate the upper and lower relations of the codec classes belonging to the codec level thereof again as necessary, and also cause the recording/playback apparatuses compatible with the codec level thereof to be compatible with the new codec class as necessary, and accordingly, the stipulations (contents) of the other codec levels, and the recording/playback apparatuses compatible with the other codec levels are not affected with the new codec class.

Also, for example, as shown in FIG. 2, in the event that the three codec levels AVC_A, AVC_B, and AVC_C have been already stipulated, when stipulating a new codec level, and making a new codec class belong to the new codec level thereof, the stipulations of the three codec levels AVC_A, AVC_B, and AVC_C, and the recording/playback apparatuses compatible with each of the three codec levels AVC_A, AVC_B, and AVC_C are not affected with the new codec class and the new codec level.

As described above, only the codec level to which the new codec class will belong is affected with the new codec class, and the other codec levels are not affected, whereby for each codec level upper compatibility between codec classes belonging to the codec level thereof can be readily maintained.

That is to say, if codec levels are not stipulated, and upper compatibility needs to be ensured regarding all of the codec classes, when attempting to add a new codec class, there is a case wherein all of the codec classes having been already stipulated are affected, and consequently, it becomes difficult to add a new codec class in some cases. On the other hand, with the new apparatus specifications, codec levels each serving as a group of one or more codec classes whose upper compatibility is ensured have been stipulated, so when attempting to add a new codec class, only the range of the codec level to which the new codec class thereof belongs is affected, whereby the new codec class can be readily added.

With regard to the deletion and modification of a codec class as well, the codec levels other than the codec level to which the codec class thereof belongs are not affected, and further, with the addition and deletion of a codec level as well, the other codec levels are not affected. Accordingly, with the new apparatus specifications, upgrading of a codec class or a codec level can be handled easily.

Codec levels and codec classes have been thus described with AVC as an example, but with the new apparatus specifications, with regard to the other coding methods other than AVC as well, codec levels and codec classes can be stipulated.

FIG. 3 shows examples of codec levels and codec classes regarding MPEG4 as a coding method other than AVC.

In FIG. 3, two of M4_A and M4_B are stipulated as codec levels. Two codec classes belong to the codec level M4_A, and three codec classes belong to the codec level M4_B.

Note that in FIG. 3, as with FIG. 2, the codec classes belonging to any one of the codec levels M4_A and M4_B are indicated with labels such as #1, #2, and #3 for the sake of convenience, but a codec class belonging to a different codec level is a different codec class regardless of such a label.

Also, in FIG. 3, description of a combination between a video format and an audio format (description equivalent to the AVC video format and the AVC audio format in FIG. 2) serving as a codec class is omitted.

In FIG. 3, the codec classes M4_Level#A_Class#1 (codec class #1 belonging to codec level M4_A) and M4_Level#A_Class#2 (codec class #2 belonging to codec level M4_A) belong to the codec level M4_A. The codec class M4_Level#A_Class#2 is an upper codec class, the codec class M4_Level#A_Class#1 is a lower codec class, so with an apparatus capable of processing the data of the codec class M4_Level#A_Class#2, the processing of the data of the codec class M4_Level#A_Class#1 needs to be ensured.

Also, the codec classes M4_Level#B_Class#1 (codec class #1 belonging to codec level M4_B), M4_Level#B_Class#2 (codec class #2 belonging to codec level M4_B), and M4_Level#B_Class#3 (codec class #3 belonging to codec level M4_B) belong to the codec level M4_B.

The codec class M4_Level#B_Class#3 is the upper codec class of the codec class M4_Level#B_Class#2, and the codec class M4_Level#B_Class#2 is the upper codec class of the codec class M4_Level#B_Class#1. Accordingly, with an apparatus capable of processing the data of the codec class M4_Level#B_Class#2, the processing of the data of the codec class M4_Level#B_Class#1 needs to be ensured. Also, with an apparatus capable of processing the data of the codec class M4_Level#B_Class#3, the processing of the data of the codec class M4_Level#B_Class#2, and further the processing of the data of the codec class M4_Level#B_Class#1 need to be ensured.

Note that in the above-mentioned cases, codec levels and codec classes have been stipulated separately regarding each of AVC and MPEG4 which are different coding methods, but codec levels and codec classes do not always need to be stipulated separately for each coding method, which can be stipulated regarding a plurality of coding methods.

That is to say, for example, in the event that five codec levels #A, #B, #C, #D, and #E have been stipulated, the codec level #A may be the codec level AVC_A in FIG. 2, the codec level #B may be the codec level AVC_B in FIG. 2, the codec level #C may be the codec level AVC_C in FIG. 2, the codec level #D may be the codec level M4_A in FIG. 3, and the codec level #E may be the codec level M4_B in FIG. 3.

Also, in the above-mentioned cases, an arrangement has been made wherein first codec classes are stipulated, and a group of codec classes whose upper compatibility is ensured (upper compatibility is made ensured) is taken as a codec level, but inversely, an arrangement may be made wherein first a codec level is stipulated, and codec classes whose upper compatibility is made ensured are stipulated as to the codec level thereof.

That is to say, for example, in FIG. 2, the codec level AVC_A is stipulated so as to be compatible with the high profile of AVC, the codec level AVC_B is stipulated so as to be compatible with the main profile of AVC, and the codec level AVC_C is stipulated so as to be compatible with the baseline profile of AVC, and further, codec classes whose upper compatibility is made ensured are stipulated within each range of the high profile, main profile, and baseline profile. Codec classes whose upper compatibility is made ensured within the range of the high profile of AVC can belong to the codec level AVC_A, codec classes whose upper compatibility is made ensured within the range of the main profile of AVC can belong to the codec level AVC_B, and codec classes whose upper compatibility is made ensured within the range of the baseline profile of AVC can belong to the codec level AVC_C.

Next, FIG. 4 illustrates a configuration example of a video camera serving as a recording/playback apparatus conforming to the new apparatus specifications.

In FIG. 4, a video camera comprises a camera unit 1, a camera DSP (Digital Signal Processor) unit 2, SDRAM (Synchronous Dynamic Random Access Memory), a medium interface 4, a control unit 5, an operating unit 6, an LCD (Liquid Crystal Display) controller 7, an LCD 8, and an external interface 9. Also, with the video camera, for example, a recording medium 10 is detachable, such as a memory card employing semiconductor memory, an optical recording medium such as recordable DVD (Digital Versatile Disk), recordable CD (Compact Disc), and the like, a magnetic disk, a magnetic tape, and so forth.

The camera unit 1 comprises an optical block 11, a CCD (Charge Coupled Device) 12, a pre-processing circuit 13, a driver (optical block driver) 14, a driver (CCD driver) 15, and a timing generating circuit 16.

The optical block 11 includes a lens, a focus mechanism, a shutter mechanism, an aperture diaphragm mechanism, and so forth, and condenses light emitted from a subject on the CCD 12 serving as the subsequent stage. The CCD 12 receives light from the optical block 11, and subjects this to photoelectric conversion, thereby obtaining an image signal serving as an electric signal, and supplying this to the pre-processing circuit 13.

The pre-processing circuit 13 subjects the image signal from the CCD 12 to CDS (Correlated Double Sampling) processing to eliminate noise, and subjects this to AGC (Automatic Gain Control) processing, thereby controlling gain. Further, the pre-processing circuit 13 subjects the image signal from the CCD 12 to A/D (Analog-to-Digital) conversion, and supplies video data serving as a digital signal obtained as a result thereof to the camera DSP unit 2.

The driver 14, in response to the control from the control unit 5, supplies a driving signal configured to drive the optical block 11 to the optical block 11. Here, the optical block 11, in response to the driving signal from the driver 14, controls the focus mechanism, shutter mechanism, and aperture diaphragm mechanism.

The driver 15, in accordance with a timing signal from the timing generating circuit 15, supplies a driving signal configured to drive the CCD 12 to the CCD 12. The timing generating circuit 16, in response to the control from the control unit 5, generates a timing signal representing predetermined timing, and supplies this to the CCD 12 and the driver 15. Here, the CCD 12 is driven by the driving signal from the driver 15, performs photoelectric conversion in accordance with the timing signal from the timing generating circuit 16, and supplies an image signal obtained as a result thereof to the pre-processing circuit 13.

The camera DSP unit 2 comprises an automechanism control unit 21, a codec 22, and an SDRAM controller 23.

The automechanism control unit 21 generates a control signal configured to control automechanism such as AF (Auto Focus), AE (Auto Exposure), AWB (Auto White Balance), and so forth based on video data supplied from (the pre-processing circuit 13 of) the camera unit 1, a measured value of brightness of a subject supplied from an unshown actinometer, and so forth, and supplies this to the control unit 5. Here, the control unit 54 controls the driver 14 based on the control signal from the automechanism control unit 21.

The codec 22 encodes or decodes data in accordance with the codec class of the codec level with which the video camera in FIG. 4 is compatible. That is to say, the codec 22 encodes video data supplied from the camera unit 1, and video data supplied from the control unit 5, and supplies coded data obtained as a result thereof to the control unit 5. Also, the codec 22 decodes coded data supplied from the control unit 5, and supplies vide data obtained as a result thereof to the control unit 5.

The video camera in FIG. 4 includes an unshown microphone, and speakers, and audio data obtained from the microphone is arranged to be supplied to the camera DSP unit 2. The codec 22 of the camera DSP unit 2 is configured to encode the video data supplied from the camera unit 1, and also encodes the audio data supplied from the microphone, i.e., encode an moving image with audio. Also, the codec 22 is configured to perform decoding of the coded data of a moving image with audio, and the video data and audio data obtained with the decoding thereof is supplied to the control unit 5. The control unit 5 displays the video data from the codec 22, for example, on the LCD 8, and also outputs the audio data from the codec 22 from the unshown speakers.

Note that the flow of processing performed as to audio data is basically the same as the flow of processing performed as to video data, and hereafter, in order to avoid that explanation becomes complicated, description will be made only regarding video data, and description will be omitted regarding audio data.

The SDRAM controller 23 controls reading/writing of data as to the SDRAM 3.

The SDRAM 3 stores data in accordance with the control of the SDRAM controller 23. That is to say, the video data supplied from the camera unit 1 to the camera DSP unit 2, and the coded data supplied from the control unit 5 to the camera DSP unit 2 are arranged to be stored in the SDRAM 3 temporarily, the codec 3 encodes the video data stored in the SDRAM 3, and also decodes the coded data stored in the SDRAM 3.

Note that the video camera in FIG. 4 is conforming to the new apparatus specifications, i.e., is compatible with a certain codec class of a certain codec level of the new apparatus specifications, and the codec 22 performs encoding and decoding of the codec class of the compatible codec level. Here, in the event that the video camera in FIG. 4 is compatible with the codec class AVC_Level#A_Class#2 of the codec level AVC_A in FIG. 2, the codec 22 performs encoding and decoding of the codec class AVC_Level#A_Class#2 thereof, and hereafter, as appropriate, this encoding or decoding is referred to as AVC_Level#A_Class#2 encoding or AVC_Level#A_Class#2 decoding, respectively.

The medium interface 4 performs reading/writing of data as to the recording medium 10 mounted on the video camera in FIG. 4 in accordance with the control of the control unit 5.

The control unit 5 is a microcomputer configured by a CPU (Central Processing Unit) 51, RAM (Random Access Memory) 52, flash ROM (Read Only Memory) 53, and a clock circuit 54 being connected via a system bus 55, and controls each unit of the video camera in FIG. 4.

That is to say, the CPU 51 executes a program stored in the flash ROM 53, thereby controlling the pre-processing unit 13, driver 14, timing generating circuit 16, which make up the camera unit 1, camera DSP unit 2, medium interface 4, LCD controller 7, and external interface 9. Further, the CPU 51 controls the medium interface 4 to read out coded data from the recording medium, and supply this to the codec 22 of the camera DSP unit 2 to decode this. Also, the CPU 51 controls the medium interface 4 to record the coded data supplied from the codec 22 in the recording medium 10. Also, the CPU 15 receives the supply of the video data decoded by the codec 22, supplies this to the LCD controller 7 to display on the LCD 8. Additionally, the CPU 51 performs various types of processing in response to the operation of the operating unit 6.

The RAM 52 temporarily stores data and so forth necessary for the operations of the CPU 51. The flash ROM 53 stores a program executed by the CPU 51, and the data necessary for being held even if the power of the video camera is turned off. The clock circuit 54 counts point-in-time in sync with a predetermined clock, thereby providing the information of the current date and day of the week, the current point-in-time to the CPU 51. The CPU 51 recognizes a shooting date when shooting by the video camera was performed, and so forth based on the information from the clock circuit 54.

The operating unit 6 is operated by a user, and supplies an operating signal corresponding to an operation of the user to (the CPU 51 of) the control unit 5. Note that the button and so forth of a part of the operating unit 6 can be displayed on the LCD 8. An operation as to the button displayed on the LCD 8 can be detected, for example, by a transparent tablet being provided on the surface of the LCD 8.

The LCD controller 7 drives the LCD 8 in accordance with the video data supplied from the control unit 5. The LCD 8 is driven by the LCD controller 7, and displays an image corresponding to the driving thereof.

The external interface 9 is an interface configured to perform communication externally. The external interface 9 is connected to a personal computer, or an external apparatus such as another recording/playback apparatus conforming to the new apparatus specifications, whereby the video camera in FIG. 4 can receive the supply of video data (coded data) from the external apparatus thereof to record this in the recording medium 10, or can supply the video data (coded data) recorded in the recording medium 10 to the external apparatus.

Also, the external interface 9 can be connected to, for example, a network such as the Internet or the like, whereby the video camera in FIG. 4 can transmit the video data (coded data) stored in the recording medium 10, or can receive video data from the Internet to record this in the recording medium 10. Further, the video camera in FIG. 4 can download a program executed by the CPU 51 from the Internet via the external interface 9 to install this in the flash ROM 53.

Note that the external interface 9 may be a cable interface such as IEEE (Institute of Electrical and Electronics Engineers) 1394, USB (Universal Serial Bus), cable LAN (Local Area Network), and so forth, or may be a wireless interface such as wireless LAN.

In the event that filming is performed with the video camera thus configured, the camera unit 1 receives light externally emitted from a subject, and supplies the video data corresponding to the light thereof to the camera DSP unit 2. The camera DSP unit 2 subjects the video data from the camera unit 1 to necessary signal processing, and supplies this to the control unit 5. The control unit 5 supplies the video data from the camera DSP unit 2 to the LCD controller 7 to display this on the LCD 8.

Also, in the event that the user has operated the operating unit 6 to instruct recording, the control unit 5 controls the camera DSP unit 2. Thus, the camera DSP unit 2 subjects the video data from the camera unit 1 to necessary signal processing, following which encodes the video data thereof at the codec 22, and supplied coded data obtained as a result thereof to the control unit 5. The control unit 5 supplies the coded data from (the codec 22 of) the camera DSP unit 2 to the medium interface 4 to record this in the recording medium 10 as a file.

On the other hand, in the event that the video data recorded in the recording medium 10 is played at the video camera, the control unit 5 controls the medium interface 4, thereby reading out the coded data recorded as a file from the recording medium 10, and supplying this to the codec 22 of the camera DSP unit 2. The codec 22 decodes the coded data from the control unit 5, and supplies video data obtained as a result thereof to the control unit 5. The control unit 5 supplies the video data from the codec 22 to the LCD controller 7 to display this on the LCD 8.

As described above, with the video camera in FIG. 4, video data is encoded into coded data, and is recorded in the recording medium 10 as a file. Also, the coded data recorded in the recording medium 10 as a file is read out, and is decoded into video data (played).

Incidentally, the recording medium 10 is detachable, so for example, there is a case wherein the recording medium 10 is mounted on a recording/playback apparatus (another recording/playback apparatus) other than the video camera in FIG. 4, and a file such as a moving image and so forth is recorded in the recording/playback apparatus thereof. Thus, in the event that the recording medium 10 in which a file was recorded at another recording/playback apparatus is mounted on the video camera in FIG. 4, and the file recorded in the recording medium 10 thereof is played, it is necessary for the video camera in FIG. 4 to determine whether or not the file recorded in the recording medium 10 can be played.

In order to facilitate processing arranged to determine whether or not the file recorded in the recording medium 10 can be played, with the new apparatus specifications, a management method arranged to manage the files recorded in the recording medium 10 is stipulated.

Description will be made regarding a file management method stipulated with the new apparatus specifications with reference to FIG. 5.

Figure 5:
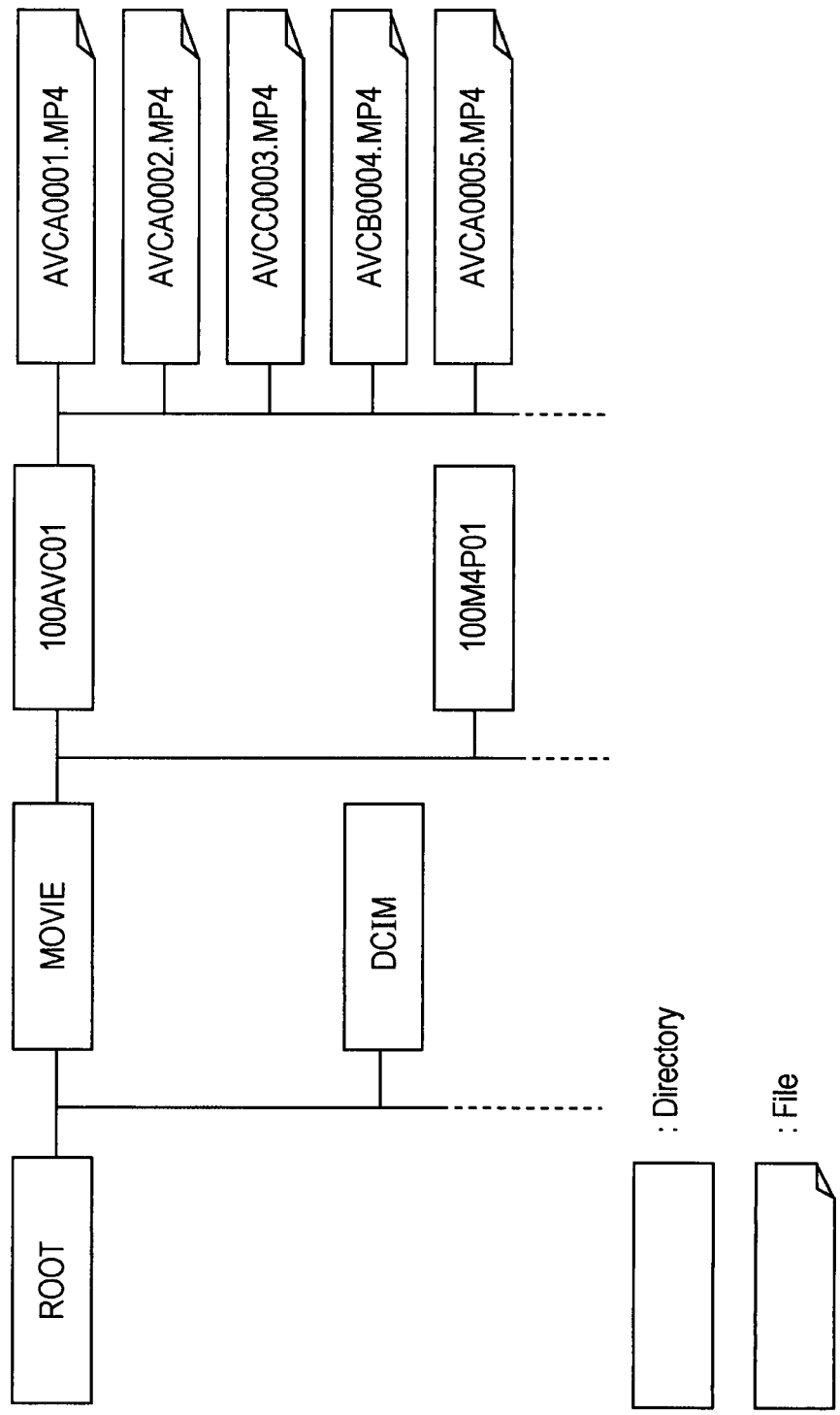
FIG. 5 is a diagram illustrating a directory configuration example of a recording medium 10.

FIG. 5 illustrates a directory (file) configuration example of the recording medium 10 configured in accordance with the file management method stipulated with the new apparatus specifications.

In FIG. 5, a directory whose directory name is MOVIE (hereafter, referred to as MOVIE directory), and a directory whose directory name is DCIM (hereafter, referred to as DCIM directory) are created immediately under the ROOT directory (hereafter, referred to as ROOT directory) of the recording medium 10.

Now, the DCIM directory is referred to as a DCF (Design rule for Camera File system) image ROOT directory, and the DCIM of the directory name thereof is the abbreviation of Digital Camera IMages. Still image files and so forth are recorded under the DCIM directory.

Moving image files are recorded under the MOVIE directory. However, the directory whose directory name represents the coding method of coded data stored in a moving image file is created immediately under the MOVIE directory. In FIG. 5, a directory whose directory name is 100AVC01 (hereafter, referred to as 100AVC01 directory), and a directory whose directory name is 100M4P01 (hereafter, referred to as 100M4P01 directory) are created immediately under the MOVIE directory.

"AVC" of "100AVC01" which is the directory name of the 100AVC01 directory represents AVC encoding. In the 100AVC01 directory a file storing coded data subjected to AVC encoding which is the coding method represented with "100AVC01" serving as the directory name thereof is recorded (placed).

"M4P" of "100M4P01" which is the directory name of the 100M4P01 directory represents MPEG4 encoding. In the 100M4P01 directory a file storing coded data subjected to MPEG4 encoding which is the coding method represented with "100M4P01" serving as the directory name thereof is recorded.

Now, for example, in the event that recording of a file as to the recording medium 10 is performed with a file format conforming to ISO/IEC14496-part12, 14, 15, a file name whose suffix is the same (MP4) needs to be employed as to not only a file of coded data AVC-encoded (hereafter, referred to as AVC file as appropriate), but also a file of coded data MPEG4-encoded (hereafter, referred to as MPEG4 file as appropriate). In this case, it is difficult to determine whether the file is an AVC file or MPEG4 file only by referencing a file name.

Consequently, with the present embodiment, a directory whose directory name represents the coding method of coded data to be stored in a moving image file is created immediately under the MOVIE directory, and in the directory thereof a file of coded data encoded with the coding method represented with the directory name thereof is recorded.

That is to say, for example, as described above, in the 100AVC01 directory whose directory name represents AVC encoding an AVC file storing coded data AVC-encoded is recorded. Also, in the 100M4P01 directory whose directory name represents MPEG4 encoding an MPEG4 file storing coded data MPEG4-encoded is recorded.

In this case, even if a file whose file name includes the same suffix as another file, the coding method of coded data stored in the file thereof can be determined (recognized) from the directory name of the directory where the file is recorded. Specifically, for example, with regard to an AVC file and an MPEG4 file whose suffixes are the same, it can be recognized whether a file recorded in the recording medium 10 is an AVC file or MPEG4 file by determining whether the file thereof is recorded in the 100AVC01 directory or 100 MP401 directory.

In FIG. 5, AVC files whose file names are AVCA0001.MP4, AVCA0002.MP4, AVCC0003.MP4, AVCB0004.MP4, and AVCA0005.MP4 are recorded immediately under the 100AVC01 directory. Now, hereafter, the AVC files AVCA0001.MP4, AVCA0002.MP4, AVCC0003.MP4, AVCB0004.MP4, and AVCA0005.MP4 are referred to as AVCA0001.MP4 file, AVCA0002.MP4 file, AVCC0003.MP4 file, AVCB0004.MP4 file, and AVCA0005.MP4 file respectively, as appropriate.

The suffixes of the file names of the AVC files recorded immediately under the 100AVC01 directory are set to MP4, which conform to ISO/IEC14496-part12, 14, 15.

Also, in FIG. 5, the portion other than the suffix of the file name of an AVC file includes characters (character string) representing the codec level of coded data stored in the AVC file thereof. That is to say, in FIG. 5, the fourth character from the top of the portion other than the suffix of the file name of an AVC file represents the codec level of coded data stored in the AVC file thereof.

In FIG. 5, the AVC file whose fourth character from the top is "A" is an AVC file storing the coded data of any codec class of the codec level AVC_A (FIG. 2) regarding AVC encoding. Accordingly, in FIG. 5, the AVCA0001.MP4 file, AVCA0002.MP4 file, and AVCA0005.MP4 file are AVC files storing the coded data of any codec class of the codec level AVC_A regarding AVC encoding.

Also, in FIG. 5, the AVC file whose fourth character from the top is "B" is an AVC file storing the coded data of any codec class of the codec level AVC_B (FIG. 2) regarding AVC encoding. Accordingly, in FIG. 5, the AVCB0004.MP4 file is an AVC file storing the coded data of any codec class of the codec level AVC_B.

Further, in FIG. 5, the AVC file whose fourth character from the top is "C" is an AVC file storing the coded data of any codec class of the codec level AVC_C (FIG. 2) regarding AVC encoding. Accordingly, in FIG. 5, the AVCC0003.MP4 file is an AVC file storing the coded data of any codec class of the codec level AVC_C.

In FIG. 5, the portion other than the suffix of the file name of an AVC file includes, in addition to the character representing the codec level of coded data stored in the AVC file thereof, characters (character string) representing the coding method of the coded data thereof, i.e., AVC encoding. Specifically, in FIG. 5, the three characters "AVC" from the top through the third character of the portion other than the suffix of the file name of an AVC file represents AVC encoding serving as the coding method of coded data stored in the AVC file thereof.

Further, in FIG. 5, a four-digit number (decimal number) is employed as the four characters from the top to the fifth character other than the suffix of the file name of an AVC file. The four digits are a number to be applied to a file (hereafter, referred to as file serial number) within the 100AVC01 directory, which is incremented by one at a time each time a new AVC file is created, for example, serving as an initial value through 9999. In the event that 0001 through 9999 can be employed as a file serial number, 9999 AVC files can be recorded at the maximum within the 100AVC01 directory.

Note that in FIG. 5, assuming that the maximum number of characters of the portion other than the suffix of a file name is restricted to eight characters for example, the maximum number of digits (four digits) are employed as a file serial number, which can be represented with four characters except for the one character representing a codec level, and the three characters representing a coding method (AVC) from the eight characters serving as the maximum number of characters of the portion other than the suffix of the file name of an AVC file, but in the event that a number of characters greater than eight characters can be employed as the maximum number of characters of the portion other than the suffix of a file name, numbers of a greater number of digits can be employed as the file serial number.

With the video camera in FIG. 4 conforming to the new apparatus specifications, file management is thus performed.

That is to say, with the video camera in FIG. 4, in the event that a moving image file is recorded in the recording medium 10, (the CPU 51 of) the control unit 5 searches the MOVIE directory immediately under the ROOT directory of the recording medium 10 via the medium interface 4, and further searches the directory whose directory name represents the coding method of coded data stored in a file to be recorded (hereafter, referred to as recorded object file as appropriate) immediately under the MOVIE directory. Specifically, in the event that a recorded object file is, for example, an AVC file, the control unit 5 searches the directory, and in the event that a recorded object file is, for example, an MPEG4 file, the control unit 5 searches the 100M4P01 directory.

Note that in the event that there is no MOVIE directory immediately under the ROOT directory of the recording medium 10, the control unit 5 creates the MOVIE directory immediately under the ROOT directory. Also, in the event that there is no directory whose directory name represents the coding method of coded data stored in a recorded object file immediately under the MOVIE directory, the control unit 5 creates the directory thereof immediately under the MOVIE directory.

For example, now, assuming that a recorded object file is an AVC file, the control unit 5 records an AVC file serving as a recorded object file in the 100M4P01 directory. At this time, the control unit 5 sets a file name obtained as the file name of the recorded object file by appending a file serial number to the string of characters representing the coding method of coded data to be stored in the AVC file thereof, and a character representing a codec level, appending a file serial number thereto, and further appending MP4 thereto as a suffix.

Now, the characters representing the coding method of coded data to be stored in an AVC file are "AVC". Also, when assuming that the codec level of coded data to be stored in an AVC file is, for example, the codec level AVC_A (FIG. 2), the character representing the codec level of coded data to be stored in the AVC file is "A". Further, now, as shown in FIG. 5, when assuming that the five AVC files (AVCA0001.MP4 file, AVCA0002.MP4 file, AVCC0003.MP4 file, AVCB0004.MP4 file, and AVCA0005.MP4 file) have been already recorded in the 100M4P01 directory, the file serial number of an AVC file to be recorded next is the maximum file serial number of the already recorded AVC files, i.e., in FIG. 5, 0006 obtained by incrementing 0005 serving as the file serial number of the AVCA0005.MP4 of the five AVC files by one.

The control unit 5 searches the maximum file serial number (0005) of the already recorded AVC files within the 100AVC01 directory, and determines 0006 which is a value obtained by adding one to the file serial number thereof as the serial number of an AVC file serving as a recorded object file. Subsequently, the control unit 5 obtains AVCA0006.MP4 as the file name of an AVC file serving as a recorded object file by arraying the character string "AVC" representing the coding method, the character string "A" representing the codec level AVC_A, and 0006 serving as a file serial number in order thereof, and appending the suffix MP4 thereto.

As described above, with the recording medium 10, a file is recorded in a directory whose directory name represents the coding method of coded data stored in the file thereof, for example, the 100AVC01 directory or 100M4P01 directory, so with a recording/playback apparatus on which the recording medium 10 is mounted, in the event of determining whether or not a file recorded in the recording medium 10 can be played, it is necessary only to determine whether playback can be performed regarding only a file within a directory whose directory name represents the coding method of coded data which the recording/playback apparatus thereof can decode (play) as an object.

That is to say, for example, in the event that the recording medium 10 is mounted on the video camera in FIG. 4, and the codec 22 is a codec configured to perform AVC encoding and decoding, it is necessary for the video camera only to determine whether playback can be performed regarding only a file within the 100AVC01 directory which is a directory whose directory name represents AVC as an object, and accordingly, processing arranged to determine whether a file can be played can be readily (rapidly) performed as compared with the case of processing all the files of all the directories on the recording medium 10 as objects.

In FIG. 5, an arrangement has been made wherein for each coding method a directory whose directory name represents the coding method thereof is created, and in the directory thereof a file storing coded data of the coding method represented with the directory name of the directory thereof is recorded regardless of the codec level and codec class of the coded data thereof, but an arrangement may be made wherein a directory is created for each coding method, a directory is created for each codec level, and further a directory is created for each codec class, and a file storing coded data of a certain codec class of a certain codec level is recorded in a directory representing the coding method, codec level, and codec class thereof.

In this case, with a recording/playback apparatus compatible with a certain coding method, a certain codec level, and a certain codec class, a file recorded within a directory representing the coding method, codec level, and codec class thereof can be always played, whereby the processing arranged to determine whether or not a file recorded in the recording medium 10 can be played can be readily performed.

However, in the event that the codec class of the codec level with which the recording/playback apparatus is compatible is an upper codec class, the recording/playback apparatus thereof, as described above, can process the data of a lower codec class of the same codec level, i.e., can play a file storing coded data of a lower codec class of the same codec level.

Accordingly, in this case, for example, when attempting to display a list of files (file names) which the recording/playback apparatus can play, the recording/playback apparatus needs to search files within a directory representing the coding method, codec level, and codec class with which the recording/playback apparatus is compatible, and also search files within another directory, i.e., files within a directory representing a lower codec class than the codec class of the codec level with which the recording/playback apparatus is compatible.

Thus, in the event that files which the recording/playback apparatus can play are disposed within a plurality of directories, it takes some time to display a list of files which the recording/playback apparatus can play as compared with a case wherein files which the recording/playback apparatus can play are disposed within one directory alone.

That is to say, in the event of displaying a list of files, with the list thereof, the request of making the list of files into the order of record is high. Subsequently, for example, as shown in FIG. 5, when assuming that for each directory a file serial number is appended to the file name of a file within the directory thereof, for example, in the event that all the files of coded data AVC-encoded are recorded in the 100AVC01 directory which is one directory, the order of record of the files of coded data AVC-encoded is identical to the ascending order of the file serial numbers represented with the file names thereof, so the order of record can be immediately recognized by referencing the file serial numbers.

On the other hand, in the event that files to be displayed on a list are disposed within a plurality of directories, with regard to files within each directory of the plurality of directories, the order of record can be recognized by referencing the file serial numbers represented with the file names thereof, but it is difficult to recognize the order of record of files within different directories by referencing the file serial numbers. Accordingly, in the event that files to be displayed on a list are disposed within a plurality of directories, the order of record of the files to be displayed in a list needs to be recognized by referencing date and time of record on the recording medium 10 and so forth recorded as management information arranged to manage the files, which takes time to recognize the order of record of the files.

In FIG. 5, an arrangement has been made wherein from a viewpoint of speeding up of display of the list of files, a directory is created for each coding method, and also for each codec level, and further a directory is created not for each codec class but for each coding method alone.

Note that in the above-mentioned case, characters (string) representing the coding method of coded data stored in a file (e.g., "AVC" representing AVC encoding, or the like) are arranged to be included in the file name of the file thereof, but a file of coded data of a certain coding method is recorded in a directory whose directory name represents the coding method thereof, so the coding method of coded data stored in the file can be determined from the directory name of the directory in which the file thereof is recorded, and accordingly, characters representing the coding method of coded data stored in a file may not necessarily be included in the file name of the file thereof.

Also, in the above-mentioned case, in the portion other than the suffix of the file name of a file, in addition to a character representing the coding method of coded data stored in the file thereof, and a character representing the codec level of the coded data thereof, characters (string) representing the codec class of the coded data thereof may be included.

However, in the event that the maximum number of characters of the portion other than the suffix of a file name is restricted to small number of characters such as eight characters described above, upon characters representing a codec class being included in the portion other than the suffix of a file name, it is necessary to reduce the digits of a file serial number for the amount equivalent to the number of characters thereof, and consequently, the number of file names which can be used for files on the recording medium 10, and consequently, the number of files which can be recorded in the recording medium 10 is reduced. Accordingly, it is preferable to further include characters representing a codec class in the portion other than the suffix of a file name, in the event that it is allowed to make the number of characters of the portion other than the suffix of a file name more than a certain amount of numbers (e.g., in the event that it is allowed to employ a so-called long file name).

Also, in the above-mentioned case, the following method is employed as a management method arranged to manage a moving image file on the recording medium 10:

(1) Immediately under the ROOT directory, the MOVIE directory in which a moving image file is stored, is disposed.

(2) Immediately under the MOVIE directory, for example, the 100AVC01 directory and 100M4P01 directory each serving as a directory whose directory name represents a coding method are disposed, and in the 100AVC01 directory or 100M4P01 directory a file storing coded data of the coding method represented with the directory name of the directory thereof is recorded.

(3) As the suffix of the file name of a file of coded data a suffix conforming to ISO/IEC14496-part12, 14, 15 is employed, and characters representing the coding method of coded data stored in a file, and a character representing the codec level of the coded data thereof, and a file serial number are included in the portion other than the suffix of a file name.

However, with the new apparatus specifications arranged to stipulate codec classes and codec levels, what is indispensable is to include a character representing a codec level in a file name, and the other matters are optional.

For example, in the event that only moving image files are recorded in the recording medium 10, and the moving image files thereof are only files in which coded data encoded with a specific coding method, for example, such as AVC encoding or the like is stored, the files thereof can be recorded, for example, immediately under the ROOT directory. However, in this case, the file name of a file to be recorded in immediately under the ROOT directory needs to include a character representing the codec level of coded data stored in the file thereof.

Next, description will be made regarding recording processing arranged to encode video data filmed with the video camera in FIG. 4 to record this in the recording medium 10 with reference the flowchart in FIG. 6.

Now, let us say that the MOVIE directory has already existed immediately under the ROOT directory of the recording medium 10.

For example, upon a recoding button (not shown) which allows a user to instruct recording on the operating unit 6 being operated by the user, in step S1 (the CPU 51 of) the control unit 5 controls the medium interface 4 to create a directory whose directory name represents a coding method by which the codec 22 performs encoding (decoding) immediately under the MOVIE directory of the recording medium 10, and proceeds to step S2. Specifically, in the event that the coding method by which the codec 22 performs encoding is, for example, AVC, the control unit 5 controls the medium interface 4 to create the 100AVC01 directory (FIG. 5) immediately under the MOVIE directory of the recording medium 10.

Here, with the video camera in FIG. 4, or another recording/playback apparatus conforming to the new apparatus specifications, a directory whose directory name represents the coding method by which the codec 22 performs encoding has been already created immediately under the MOVIE directory in some cases. In this case, the processing in step S1 is skipped.

In step S2, the control unit 5 controls the medium interface 4 to create a file whose file name represents a codec level with which the codec 22 is compatible immediately under a directory whose directory name represents the coding method by which the codec 22 performs encoding as a recorded object file.

That is to say, in the event that the coding method by which the codec 22 performs encoding is, for example, AVC, and the codec 22 is compatible with, for example, the codec class AVC_Level#A_Class#2 of the codec level AVC_A, the control unit 5 first recognizes the maximum file serial number by referencing the file names of the files within the 100AVC01 directory (FIG. 5) which is a directory whose directory name represents AVC, and increments the file serial number thereof by one to obtain this value as the file serial number of the recorded object file. For example, as shown in FIG. 5, in the event that with the 100AVC01 directory, 0005, which is the file serial number of the AVCA0005.MP4 file, is the maximum file serial number, 0006 is obtained as the file serial number of the recorded object file.

Further, the control unit 5 creates a file name "AVCA0006.MP4" obtained by arraying the characters "AVC" representing the coding method by which the codec 22 performs encoding, the character "A" representing the codec level AVC_A with which the codec 22 is compatible, and 0006 obtained as the file serial number of the recorded object file in order thereof, and further appending the suffix "MP4" thereto, as the file name of the recorded object file, and creates (opens) the file (recorded object file) of the file name thereof within the 100AVC01 directory.

Subsequently, the control unit 5 proceeds to step S3, where encoding of the video data supplied from the camera unit 1 to the camera DSP unit 2 is started at the codec 22, and the control unit 5 proceeds to step S4. In other words, the codec 22 encodes the video data supplied from the camera unit 1 to the camera DSP unit 2, and supplies coded data obtained as a result thereof to the control unit 5.

In step S4, the control unit 5 controls the medium interface 4 to record the information (class information) of the codec class with which the codec 22 is compatible, and so forth in the recording medium 10 as the management information of the recorded object file, and further, the control unit 5 starts recording of the coded data supplied from the codec 22 as to the recorded object file created in step S2. In other words, in step S3 the codec 22 starts an operation wherein the video data supplied from the camera unit 1 to the camera DSP unit 2 is encoded, and coded data obtained as a result thereof is supplied to the control unit 5, but the control unit 5 controls the medium interface 4 to record the coded data thus supplied from the codec 22 in the recorded object file on the recording medium 10.

Encoding of video data started by the codec 22 in step S3, supply of coded data obtained as a result thereof to the control unit 5, and recording of the decoded data in the recorded object file started by the control unit 5 in step S4 are repeated, for example, until the user operates the recording button on the operating unit 6 again. Subsequently, upon the operator operating the recording button on the operating unit 6 again, the codec 22 stops encoding of the video data, and also the control unit 5 stops recording of the coded data. Further, the control unit 5 controls the medium interface 4 to close the recorded object file, and ends the recording processing.

Note that in the event that the codec 22 can perform encoding with a plurality of codec classes, i.e., in the event that the codec 22 can perform encoding of different codec classes of the same codec level, or in the event that the codec 22 can perform encoding of a codec class of different codec levels, when recording (a file of) coded data in the recording medium 10, the user can choose beforehand whether encoding of which one of the plurality of codec classes is performed. Specifically, when display of a selection menu where the user selects a codec class is instructed by the user operating the operating unit 6, the control unit 5 controls the LCD controller 7 to display a selection menu where the user selects any one of the plurality of codec classes. Subsequently, upon the user performing an operation arranged to select a desired codec class by operating the operating unit 6, the control unit 5 controls the codec 22 to perform encoding of the selected codec class.

Also, in the event that the codec 22 can perform encoding with a plurality of codec classes, in addition to performing encoding of one of the plurality of codec classes, encoding of two or more codec classes is performed in parallel, each piece of coded data obtained by encoding of the two or more codec classes thereof can be recorded in a separate file. Specifically, for example, in the event that the codec 22 is compatible with the codec class of the codec level AVC_A, the codec 22 performs encoding each of the codec class and the lower codec class thereof, and the control unit 5 can record the file of the coded data of each of the codec classes AVC_Level#A_Class#1 and AVC_Level#A_Class#2 in the recording medium 10. In this case, when the recording medium 10 is mounted on the recording/playback apparatus compatible with the codec class AVC_Level#A_Class#1, the file of coded data of the codec class AVC_Level#A_Class#1 can be played at the recording/playback apparatus thereof. Also, when the recording medium 10 is mounted on the recording/playback apparatus compatible with the codec class AVC_Level#A_Class#2, the file of coded data of the codec class AVC_Level#A_Class#2 and also the file of coded data of the lower codec class AVC_Level#A_Class#1 can be played at the recording/playback apparatus thereof.

Figure 6:
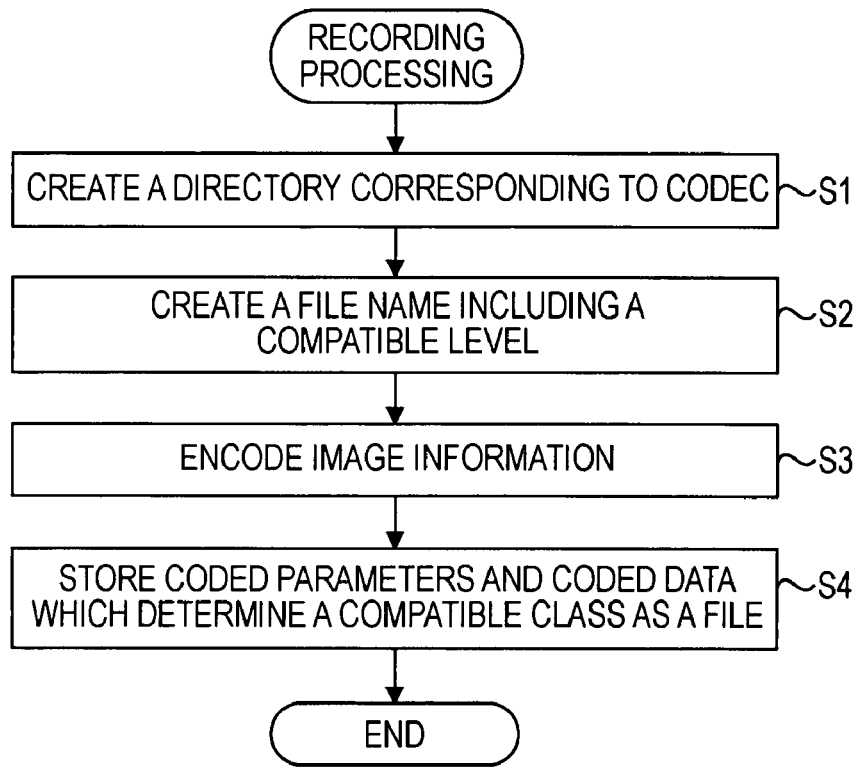
FIG. 6 is a flowchart describing recording processing.

Next, with the recording processing in FIG. 6, as described in step S4, in the recording medium 10 not only coded data is recorded as a file, but also the information of a codec class with which the codec 22 is compatible is recorded as the management information of the coded data file.

The information of a codec class with which the codec 22 is compatible which is recorded as the management information of a coded data file is information by which the codec class thereof can be determined, an example of which is characters (string) "AVC_Level#A_Class#2". Also, as for the information of a codec class, the picture size, maximum bit rate, profile, or (information representing) the other parameters with which the codec class thereof is compatible may be employed.

Note that as for the management information of a coded data file, for example, information by which a codec level can be determined (e.g., characters (string) "AVC_A" and so forth), a thumbnail which is a reduction of the top frame of video data obtained by decoding coded data, the recorded date and time of a file, and so forth can be employed as well as the information of a codec class.

Also, as for a method arranged to record the management information of a coded data file in the recording medium 10, there are provided a method arranged to store (record) the management information in the file thereof (self-connotation type), and a method arranged to create a file for management information (hereafter, referred to as management file) separately from a coded data file, and store the management information of a coded data file on the recording medium 10 in the management file thereof collectively (external reference type).

Figure 7:
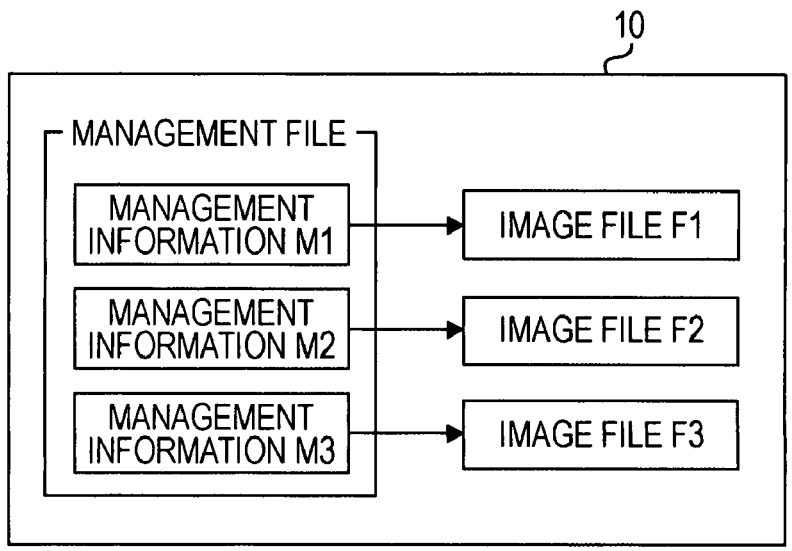
FIG. 7 is a diagram describing a state in which management information is recorded in a management file collectively.

In the event that the management information of a coded data file on the recording medium 10 is stored in the management file collectively, as shown in FIG. 7, a pointer representing a recorded position on the recording medium 10 of a corresponding data file as to the entity of the file thereof can be included in the management information. In this case, a coded data file can be rapidly accessed by referencing the pointer within the management file.

In the event of storing the management information including the information of a codec class in a coded data file, in order to determine a codec class, it is necessary to open each coded data file to reference the management information, but in the event that the management information including the information of a codec class is stored in the management file collectively, the codec class of each coded data file can be determined by opening the management file thereof alone to reference the management information.

That is to say, in the event that the management information including the information of a codec class is stored in the management file collectively, the codec class of each coded data file can be determined without opening each coded data file, and accordingly, for example, in the event that the recording medium 10 is a disc-shaped recording medium such as optical disc or the like, the number of times of seeks, and consequently seek time, can be reduced, whereby the codec class of each of a great number of files of coded data can be rapidly determined.

Note that, for example, all of the management information of moving image (coded data) files on the recording medium 10 can be stored in the management file, and also a management file is created for each coding method, and only the management information of coded data file of the coding method thereof can be stored in the management file of a certain coding method collectively. In the event of storing all of the management information of moving image files on the recording medium 10 in one management file, the management file thereof is disposed immediately under the MOVIE directory (FIG. 5) for example. Also, in the event that a management file is created for each coding method, the management file of each coding method is disposed immediately under a directory whose directory name represents the coding method thereof.

Also, as for information by which a codec level can be determined which is included in the management information to be stored in a management file, the file name of a corresponding coded data file can be employed. In this case, a list of file names can be displayed only by referencing the management file.

Next, with the video camera in FIG. 4, list display processing can be performed wherein a list of files of (coded data of) moving images recorded in the recording medium 10 is displayed on the LCD 8.

Now, description will be made regarding list display processing with reference to the flowchart in FIG. 8.

Figure 8:
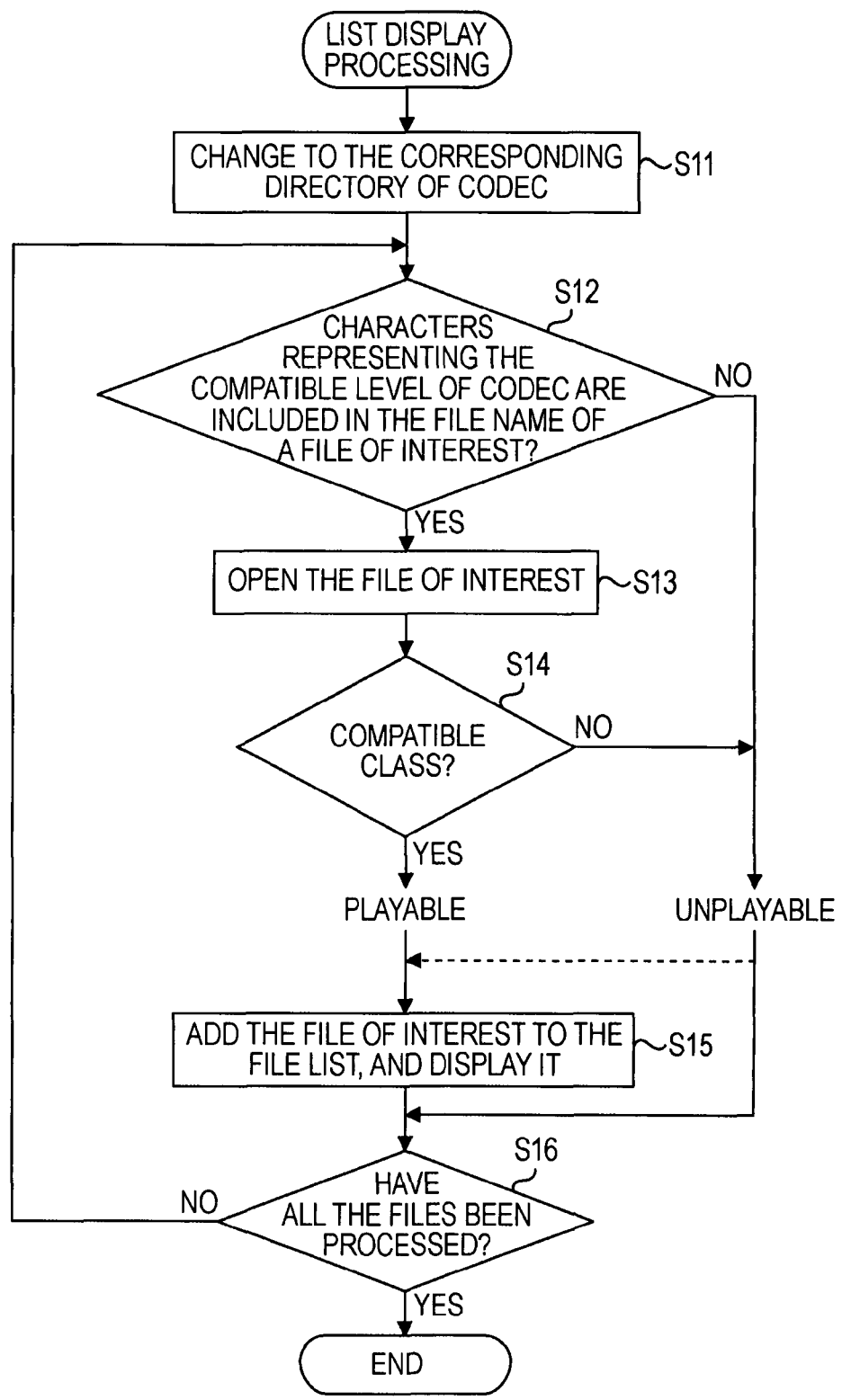
FIG. 8 is a flowchart describing list display processing.

In FIG. 8, let us say that in a coded data file the management information thereof has been stored.

For example, upon a list display button (not shown) which allows a user to instruct list display on the operating unit 6 being operated by the user, the control unit 5 controls the LCD controller 7 to display a list screen serving as a screen where a list of files is displayed on the LCD 8. Note that file names and so forth are displayed on the list screen, but at the stage immediately following the list display button being operated, the state of the list screen is in a state in which any file name etc. is not displayed.

Subsequently, in step S11 the control unit 5 controls the medium interface 4 to change the so-called current directory on the recording medium 10 into a directory whose directory name represents a coding method by which the codec 22 performs encoding, and proceeds to step S12.

In step S12, of coded data files within the current directory, the control unit 5 takes a file, which has not served as a file of interest, as a file of interest, and determines whether or not a character representing a codec level with which the codec 22 is compatible is included in the file name of the file of interest.

In step S12, in the event that determination is made that a character representing a codec level with which the codec 22 is compatible is not included in the file name of the file of interest, the control unit 5 recognizes that the file of interest is unplayable, and proceeds to step S16.

On the other hand, in step S12, in the event that determination is made that a character representing a codec level with which the codec 22 is compatible is included in the file name of the file of interest, the control unit 5 proceeds to step S13, where the control unit 5 controls the medium interface 4 to open the file of interest to read out the management information of the file of interest thereof, and proceeds to step S14.

In step S14, the control unit 5 determines, based on the management information of the file of interest read out in step S13, whether or not coded data stored in the file of interest can be played, i.e., whether or not coded data can be decoded at the codec 22.

Now, as described above, the management information of the file of interest includes the information of the codec class of coded data stored in the file of interest, and as for the information of a codec class, there are the picture size, maximum bit rate, profile, and the other parameters with which the codec class thereof is compatible. In step S14, the control unit 5 determines the codec class of coded data of the file of interest based on such parameters included in the management information, and determines whether or not the coded data stored in the file of interest can be decode at the codec 22 depending on whether or not the codec class thereof is a codec class with which the codec 22 is compatible, or the lower codec class of the codec class thereof.

Alternatively, in step S14, the control unit 5 determines whether or not the coded data stored in the file of interest can be decode at the codec 22 depending on whether or not the value of each parameter of the codec class serving as the codec class information included in the management information of the file of interest is included in (equal to or lower than) the value of each parameter of the codec class with which the codec 22 is compatible.

That is to say, of the parameters of a codec class, for example, in the event of focusing on the maximum bit rate, in step S14 the control unit 5 determines whether or not the value of the maximum bit rate of the code class serving as the codec class information included in the management information of the file of interest is equal to or smaller than the value of the maximum bit rate of the codec class with which the codec 22 is compatible.

Specifically, for example, let us say that first, second, and third codec classes belong to the codec level with which the codec 22 is compatible, and the maximum bit rates of the first through third codec classes are 15 Mbps, 40 Mbps, and 50 Mbps, respectively. Further, let us say that of the first through third codec classes, the codec 22 is, for example, compatible with the second codec class whose bit rate is 40 Mbps. In this case, if we say that the value of the maximum bit rate of the codec class serving as the codec class information included in the management information of the file of interest is represented with a variable X [Mbps], in step S14 the control unit 5 determines whether or not expression $X \leqq 40$ Mbps is satisfied.

In the event that the expression $X \leqq 40$ Mbps is not satisfied, i.e., in the event that the relation between X and 40 Mbps is represented with expression $X \leqq 40$ Mbps, in step S14 determination is made that the coded data stored in the file of interest is not decodable at the codec 22.

On the other hand, in the event that the expression $X \leqq 40$ Mbps is satisfied, in step S14 the control unit 5 further determines whether or not, for example, regarding the picture size or the other parameter other than the maximum bit rate of the parameters of the codec class, the value of the parameter of the codec class serving as the codec class information included in the management information of the file of interest is included in the value of the parameter of the codec class with which the codec 22 is compatible.

Subsequently, in the event that the value of each parameter of the codec class serving as the codec class information included in the management information of the file of interest is included in the value of each parameter of the codec class with which the codec 22 is compatible, in step S14 the control unit 5 determines that the coded data stored in the file of interest is decodable at the codec 22.

In step S14, in the event that the coded data stored in the file of interest is not decodable at the codec 22, the control unit 5 recognizes that the file of interest is unplayable, and proceeds to step S16.

Also, in step S14, in the event that the coded data stored in the file of interest is decodable at the codec 22, the control unit 5 recognizes that the file of interest is playable, and proceeds to step S15, where the control unit 5 controls the LCD controller 7 to display the file name of the file of interest on the list screen displayed on the LCD 8. That is to say, thus, for example, the file name of the file of interest is displayed on the next line of the file name displayed on the last line on the list screen.

Note that in addition to the file name of the file of interest, the thumbnail of the file of interest can be displayed on the list screen so as to accompany the file name thereof. The thumbnail of the file of interest can be generated from video data obtained by the codec 22 decoding part of the coded data stored in the file of interest, when attempting to display the thumbnail thereof on the list screen. Also, as described above, in the event that (the data of) thumbnail is included in the management information, the thumbnail thereof can be displayed on the list screen.

Following the processing in step S15, the control unit 5 proceeds to step S16, where the control unit 5 determines whether or not all of the coded data files within the current directory have been processed as a file of interest. In step S15, in the event that determination is made that there is a file which has not been processed as a file of interest of the coded data files within the current directory, the control unit 5 returns to step S12, where the control unit 5 takes one file which has not been processed as a file of interest of the coded data files within the current directory as a new file of interest, and hereafter, repeats the same processing.

Also, in step S16, in the event that determination is made that all of the coded data files within the current directory have been processed as a file of interest, the control unit 5 ends the list display processing.

As described above, as arrangement has been made wherein the coded data files of a codec level with which the codec 22 is compatible are determined based on the file names thereof from the files within a directory whose directory name represents the coding method of the codec 22, and further, the coded data files of a codec class which the codec 22 can decode are determined from the coded data files of a codec level with which the codec 22 is compatible, whereby the processing arranged to determine playable files at the video camera in FIG. 4 can be readily performed.

Note that in the event of displaying file names on the list screen in the order of record, it is necessary to assign the coded data files within the current directory to a file of interest in the ascending order of the file serial numbers thereof.

Also, with the list display processing in FIG. 8, an arrangement has been made wherein determination is made whether a file of interest is playable or unplayable (at the video camera in FIG. 4), and in the event that determination is made that the file of interest is playable, the file name of the file of interest is displayed on the list screen at that time, but another arrangement may be made wherein determination is made whether or not all the files within the current directory are playable, following which all the file names of the playable files are displayed on the list screen at a time, for example.

Further, with the list display processing in FIG. 8, assumption is made that in a coded data file the management information thereof is stored, but as shown in FIG. 7, the management information of a coded data file within the current directory may be all stored in one management file. Also, in this case, before starting the loop processing of step S12 through S16, the management file is opened, and in step S14 determination is made whether or not the coded data stored in the file of interest is decodable at the codec 22 by referencing the management information stored in the management file thereof.

Now, according to the new apparatus specifications, as described above, a recording/playback apparatus compatible a certain codec class needs to be capable of decoding not only the data of the compatible codec class but also the data of a lower codec class of the compatible codec class belonging to the same codec level. Accordingly, in the event that the codec 22 of the video camera in FIG. 4 conforming to the new apparatus specifications is compatible with, for example, the uppermost codec class of a certain codec level, the codec 22 can decode the data of all codec classes belonging to the codec level thereof, so determination can be made whether or not the file of interest is playable only by determining whether or not the character representing the codec level with which the codec 22 is compatible is included in the file name of the file of interest. That is to say, determination can be made whether or not the file of interest is playable without opening the file of interest and the management file.

Also, in the event that the codec 22 can perform decoding in accordance with a plurality of coding methods, the processing of step S12 through S16 in FIG. 8 is performed as to a coded data file within a directory whose directory name represents each of the plurality of coding methods.

Further, in FIG. 8, an arrangement has been made wherein the file names of only the coded data files which the codec 22 can decode are displayed on the list screen, but both of the file names of the coded data files which the codec 22 can decode, and the file names of the coded data files which the codec 22 fails to decode, i.e., the file names of all the coded data files within a directory whose name includes characters representing the coding method of the codec 22 can be displayed on the list screen.

Also, in the event of displaying the file names of all the coded data files within a directory whose name includes characters representing the coding method of the codec 22 on the list screen, the file names of the coded data files which the codec 22 can decode, and the file names of the coded data files which the codec 22 fails to decode can be displayed in a distinguished manner.

Figure 9:
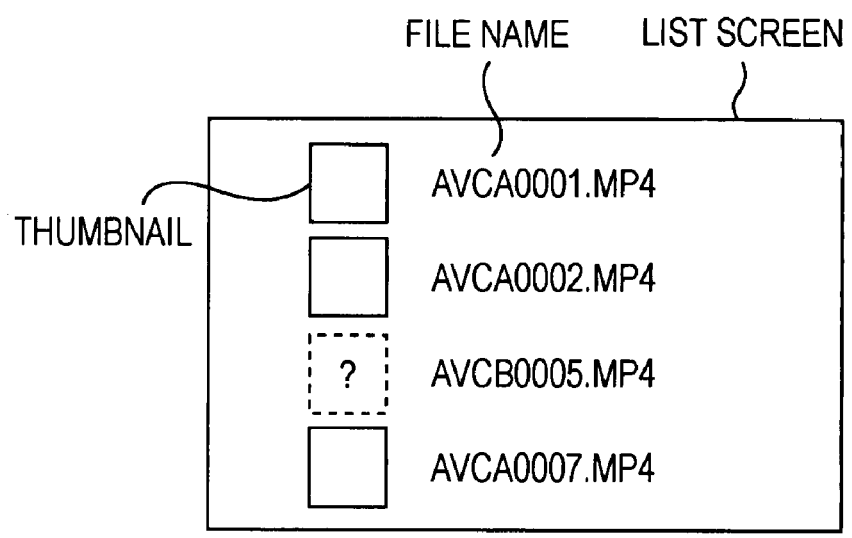
FIG. 9 is a diagram illustrating an example of a list screen.

FIG. 9 illustrates such a list screen.

With the list screen in FIG. 9, basically the file name of a coded data file within a directory whose name includes characters representing the coding method of the codec 22 is displayed in a format wherein a thumbnail is disposed immediately before the file name thereof. However, with regard to a coded data file which the code 22 fails to decode, in order to display that the file is not decodable, a question mark is displayed instead of a thumbnail.

That is to say, with the list screen in FIG. 9, the file name of a coded data file which the codec 22 can decode is displayed along with a thumbnail, and the file name of a coded data file which the codec 22 fails to decode is displayed along with a question mark.

Now, a method arranged to display the file name of a coded data file which the codec 22 can decode, and the file name of a coded data file which the codec 22 fails to decode, in a distinguished manner, is not restricted to the method employing a thumbnail and a question mark, such as shown in FIG. 9. That is to say, as for a method other than that method, for example, the file name of a coded data file which the codec 22 can decode, and the file name of a coded data file which the codec 22 fails to decode can be displayed in a distinguished manner by changing the shading of display of both file names.

In order to display the list screen shown in FIG. 9, in the event that the character representing the codec level with which the codec 22 is compatible is not included in the file name of the file of interest in step S12 of the list display processing in FIG. 8, or in the event that determination is made in step S14 that the coded data stored in the file of interest is not decodable at the codec 22, it is necessary for the control unit 5 to proceed to not step S16 but step S15 such as shown with a dotted line in the drawing, where the file name of the file of interest is displayed along with a question mark on the list screen, whereby the list screen shown in FIG. 9 can be displayed.

With the list screen in FIG. 9, the file name "AVCB0005.MP4" is displayed along with a question mark, and the user can immediately recognize by referencing this display that the file AVCB0005.MP4 is unplayable at the video camera in FIG. 4. Further, the user can immediately recognize that the files of the other file names on the list screen can be played at the video camera in FIG. 4.

As described above, the file name of a coded data file which the codec 22 can decode, and the file name of a coded data file which the codec 22 fails to decode, are displayed in a distinguished manner on the list screen, whereby the user can readily recognize a coded data file which the codec 22 can decode, and a coded data file which the codec 22 fails to decode.

Note that with the list screen, in addition to displaying the file names of coded data files within a directory whose directory name includes the character representing the codec method of the codec 22, for example, the file names of files within the MOVIE directory (including files within a lower directory of the MOVIE directory) can be displayed. In this case, the file names of all the moving image files recorded in the recording medium 10 are displayed on the list screen.

Further, in the event of displaying the file names of the files within the MOVIE directory on the list screen, as with the case of displaying the file names of the coded data files within a directory whose directory name includes the character representing the codec method of the codec 22, the file name of a coded data file which the codec 22 can decode, and the file name of a coded data file which the codec 22 fails to decode can be displayed in a distinguished manner.

As described above, the file names of files within an optional directory of the recording medium 10 can be displayed on the list screen, whereby the user can recognize files recorded in the recording medium 10 in a necessary range.

That is to say, for example, in the event that the file names of only the coded data files which the codec 22 can decode, or the file names of only the coded data files within a directory whose directory name includes the coding method of the codec 22 are displayed on the list screen, when a great number of files whose names are not displayed on the list screen are recorded in the recording medium 10, the empty capacity of the recording medium 10 is reduced as compared with the number of file names displayed on the list screen, which gives an uncomfortable feeling to the user in some cases.

In the event that the file names of the files within an optional directory of the recording medium 10 can be displayed on the list screen, the user can be prevented from being made to feel such an uncomfortable feeling.

Note that regarding whether the file names of which directory are displayed on the list screen, for example, the user can select by operating the operating unit 6.

Also, with the list screen, regarding whether the file names of only the coded data files which the code 22 can decode are displayed, or further regarding whether the file names of the coded data files which the codec 22 fails to decode are also displayed, for example, the user can select by operating the operating unit 6.

Next, in the event that the list screen such as shown in FIG. 9 is displayed on the LCD 8, the user can specify a file name on the list screen to request elimination (deletion) or playback of the file of the file name thereof, for example, by operating the operating unit 6.

For example, in the event that the elimination of a file is requested by the user operating the operating unit 6, the control unit 6 controls the medium interface 4 to eliminate the file whose elimination was requested and the management information of the file thereof from the recording medium 10.

Note that in the event that the file whose elimination was requested is a file recorded by another recording/playback apparatus other than the video camera in FIG. 4, and is a coded data file which the codec 22 fails to decode, the control unit 5 controls the LCD controller 7 to display a message (warning) to that effect on the LCD 8.

In this case, the file recorded by another recording/playback apparatus can be prevented from being eliminated accidentally.

Also, for example, in the event that the playback of a file is requested by the user operating the operating unit 6, playback processing arranged to play the file thereof is performed at the video camera in FIG. 4.

Figure 10:
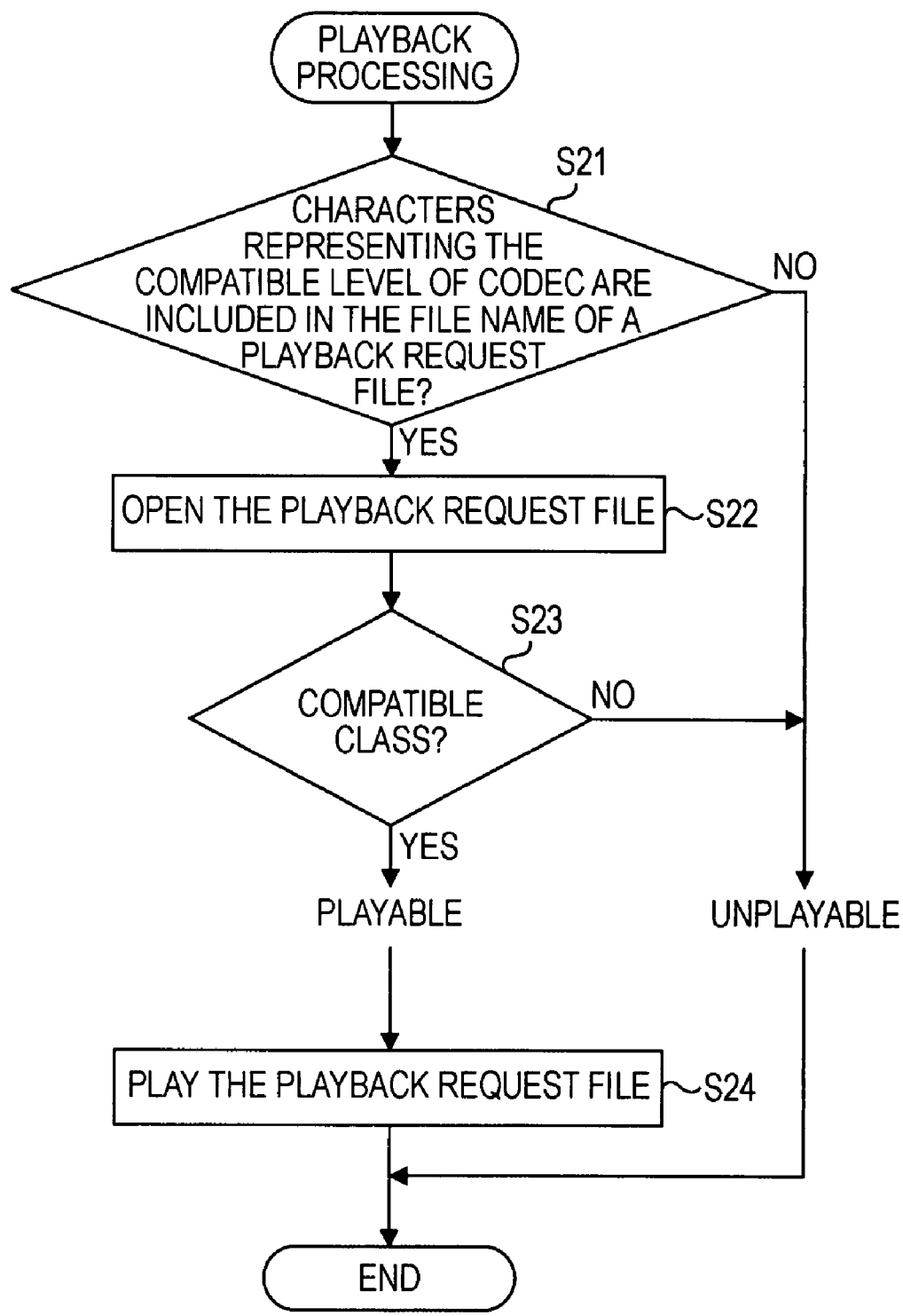
FIG. 10 is a flowchart describing playback processing.

Now, description will be made regarding playback processing with reference to the flowchart in FIG. 10.

The control unit 5 controls the medium interface 4 to read out the file name of a file whose playback was requested (hereafter, referred to as playback request file as appropriate) by the user operating the operating unit 6 from the recording medium 10, and in step S21 determines whether or not the character representing the codec level with which the codec 22 is compatible is included in the file name of the playback request file.

In the event that determination is made in step S21 that the character representing the codec level with which the codec 22 is compatible is not included in the file name of the file of interest, the control unit 5 recognizes that the playback request file is unplayable, controls the LCD controller 7 to display a message to that effect on the LCD 8, and ends the playback processing.

Also, in the event that determination is made in step that the character representing the codec level with which the codec 22 is compatible is included in the file name of the playback request file, the control unit 5 proceeds to step S22, where the control unit 5 controls the medium interface 4 to open the playback request file to read out the management information of the playback request file thereof, and proceeds to step S23.

Note that in the event that the management information of the playback request file is stored in the management file (FIG. 7), in step S22 the control unit 5 opens the management file to read out the management information of the playback request file from the management file.

In step S23, the control unit 5 determines whether or not the coded data stored in the playback request file can be played based on the management information of the playback request file read out in step S22, i.e., whether or not the coded data is playable at the codec 22, in the same way as the case in step S14 in FIG. 8.

In the event that determination is made in step S23 that the coded data stored in the playback request file is not decodable at the codec 22, the control unit 5 recognizes that the playback request file is unplayable, controls the LCD controller 7 to display a message to that effect on the LCD 8, and ends the playback processing.

Also, in the event that determination is made in step S23 that the coded data stored in the playback request file is decodable at the codec 22, the control unit 5 recognizes that the playback request file is playable, and proceeds to step S24, where the control unit 5 starts playback of the playback request file.

Specifically, the control unit 5 controls the medium interface 4 to read out the coded data stored in the playback request file from the recording medium 10, and supply this to the codec 22 of the camera DSP unit 2 to decode the coded data thereof. Video data obtained by the codec 22 decoding the coded data is supplied to the control unit 5, and the control unit 5 controls the LCD controller 7 to display the image (moving image) corresponding to the video data from the codec 22 on the LCD 8.

Subsequently, upon the playback of the playback request file being completed, or upon the user instructing end of playback by operating the operating unit 6, the control unit ends the playback processing.

Now, in the event that the codec 22 is compatible with the uppermost codec class of a certain codec level, the codec 22 can decode the data of all codec classes belonging to the codec level thereof, so determination can be made whether or not the playback request file is playable only by determining whether or not the character representing the codec level with which the codec 22 is compatible is included in the file name of the playback request file. Accordingly, in this case, in the event that determination is made in step S21 that the character representing the codec level with which the codec 22 is compatible is included in the file name of the playback request file, the control unit 5 skips the processing in steps S22 and S23, and proceeds to step S24, where the control unit 5 can start playback of the playback request file.

Figure 11:
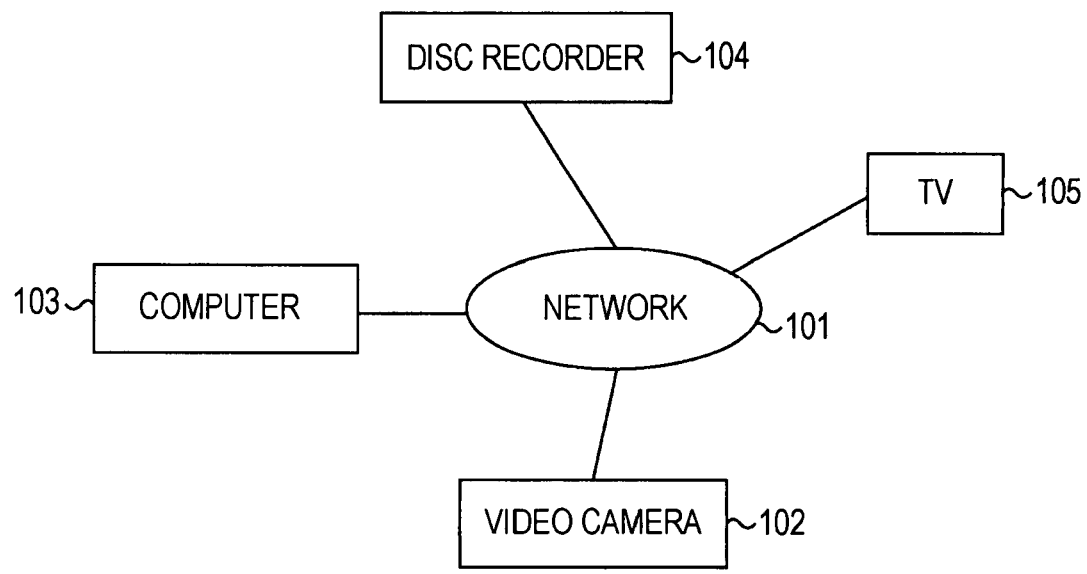
FIG. 11 is a diagram illustrating a configuration example of a home network system to which the present invention is applied.

Next, FIG. 11 illustrates a configuration example of one embodiment of a home network system (system means a group of a plurality of apparatuses gathered logically, regardless of whether each component apparatus is in the same casing) to which the present invention is applied.

In FIG. 11, for example, a video camera 102 serving as a recording/playback apparatus conforming to the new apparatus specifications, a computer 103, a disc recorder 104, and TV (television receiver) 105 are connected to a network 101 such as a LAN or the like, thereby making up a home network.

Note that the video camera 102 is, for example, the video camera shown in FIG. 4. Also, the video camera 102, computer 103, disc recorder 104, and TV 105 conform to, for example, DLNA (Digital Living Network Alliance) specifications.

With the home network system in FIG. 11, for example, the video camera 102 requests the computer 103, disc recorder 104, and TV 105, which are the other recording/playback apparatuses conforming to the new apparatus specifications, connected to the network 101, to transmit the information of a codec level and a codec class with which each apparatus is compatible via the network 101, and receives the information of a codec level and a codec class transmitted from the computer 103, disc recorder 104, and TV 105 via the network 101 in response to the request thereof.

Specifically, with the video camera 102 (FIG. 4), the information of a codec level and a codec class which each of the computer 103, disc recorder 104, and TV 105 transmits is received at the external interface 9, and is supplied and stored in (the RAM 52 or flash ROM 53 of) the control unit 5.

Subsequently, the recording medium 10 is mounted on the video camera 102, and upon playback of one of coded data files recorded in the recording medium 10 thereof being requested, the control unit 5 determines whether or not the codec 22 can decode the coded data file, and in the event of being decodable, as described in step S24 in FIG. 10, the video camera 102 starts playback of the file whose playback has been requested.

Figure 12:
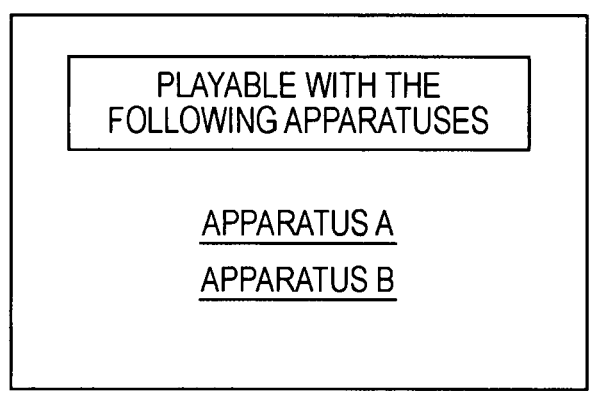
FIG. 12 is a diagram illustrating a display example of information representing playable devices.

On the other hand, in the event that the codec 22 fails to decode the coded data stored in the file whose playback has been requested, the control unit 5 references the information of a codec level and a codec class stored in the RAM 52 or flash ROM 53, i.e., the information of a codec level and a codec class with which each of the computer 103, disc recorder 104, and TV 105 is compatible, and recognizes a recording/playback apparatus (hereafter, referred to as playable apparatus as appropriate) capable of decoding the coded data stored in the file whose playback has been requested. Subsequently, the control unit 5 controls the LCD controller 7 to display information representing the playable apparatus on the LCD 8, for example, as shown in FIG. 12.

In this case, the user can readily recognize the recording/playback apparatus (playable apparatus) capable of playing a desired file (file whose playback has been requested), and can play the desired file by mounting the recording medium 10 on the recording/playback apparatus thereof.

Here, the file recorded in the recording medium 10 can be transferred from the video camera 102 on which the recording medium 10 is mounted to the playable apparatus via the network 101, and is played at the playable apparatus instead of the recording medium 10 being mounted on the playable apparatus from the video camera 102 again to play the file. Also, the playable apparatus can decode the coded data stored in the file transferred from the video camera 102, and transfer video data obtained from decoding thereof to the video camera 102 via the network 101 to display this at the video camera 102.

Note that when recording a file in the recording medium 10, the video camera 102 can recognize a recording/playback apparatus capable of playing the coded data stored in a file to be recorded other than the video camera 102, from the information of a codec level and a codec class stored in the RAM 52 or flash ROM 53, and display the information representing the recording/playback apparatus thereof on the LCD 8.

In this case, the user can determine whether or not recording is performed at the video camera 102 based on the number of recording/playback apparatuses capable of playing the file recorded at the video camera 102.

As described above, as for a coding method arranged to encode or decode data, by conforming to the new apparatus specifications wherein a codec class arranged to classify the performance of a codec configured to encode or decode data, and a codec level serving as a group of said one or more codec classes whose upper compatibility is ensured, are stipulated, the most appropriate file management can be performed without losing existing advantages even in the event of the capacity of the recording medium 10 increasing.

Note that the codec 22 can be configured of dedicated hardware, and also can be configured of software.

Also, processing steps arranged to describe a program arranged to cause (the CPU 51 of) the control unit 5 to perform various types of processing do not always need to be processed in the time sequence along the order described as the flowchart, so processing executed in parallel or individually (e.g., parallel processing or object-oriented processing) is also included.

Further, a program may be processed by one CPU, or may be processed by a plurality of CPUs.

Also, the present invention can be applied to, for example, a cell phone and other electronic equipment capable of recording and playback of data, and particularly, electronic equipment which performs recording and playback of data as to a detachable recording medium, besides a video camera, computer, disc recorder, and TV.

The invention claimed is:

1. A recording apparatus configured to record data employing a coding method arranged to encode or decode data said apparatus comprising:
   encoding means configured to encode data with said predetermined coding method into coded data of a predetermined codec class within a predetermined codec level, wherein the codec class is arranged to classify the performance of a codec configured to encode or decode data in a specific predetermined media format, and the codec level serves as a group of one or more codec classes, each class in the codec level having upward compatibility with the other classes in the same codec level, the codec class and the codec level being based on stipulated specifications; and
   recording control means configured to record said coded data encoded by said encoding means in a recording medium as a file, wherein the codec level of said coded data is represented in a portion of the file name other than the suffix or extension of the file name.

2. The recording apparatus according to claim 1, wherein said recording control means record the coded data of said predetermined codec class within said predetermined codec level in a directory whose directory name represents said predetermined coding method as a file whose name represents the codec level thereof.

3. The recording apparatus according to claim 2, wherein said recording control means creates a directory whose directory name represents said predetermined coding method in the event that there is no directory whose directory name represents said predetermined coding method in said recording medium.

4. The recording apparatus according to claim 1, wherein said recording control means records said coded data, and records class information serving as the information of the codec class of the coded data thereof in said recording medium.

5. The recording apparatus according to claim 4, wherein said recording control means records the class information of each of said one or more pieces of coded data into said recording medium as one file.

6. A recording method arranged to record data employing a coding method arranged to encode or decode data, said method comprising:
   an encoding step arranged to encode data with said predetermined coding method into coded data of a predetermined codec class within a predetermined codec level, wherein the codec class is arranged to classify the performance of a codec configured to encode or decode data in a specific predetermined media format, and the codec level serves as a group of one or more codec classes, each class in the codec level having upward compatibility with the other classes in the same codec level, the codec class and the codec level being based on stipulated specifications; and
   a recording control step arranged to record said coded data encoded in said encoding step in a recording medium as a file, wherein the codec level of said coded data is represented in a portion of the file name other than the suffix or extension of the file name.

7. A non-transitory computer readable storage medium containing instructions that cause a processor to execute recording processing wherein data is recorded, employing a coding method arranged to encode or decode data, said method comprising:
   an encoding step arranged to encode data with said predetermined coding method into coded data of a predetermined codec class within a predetermined codec level, wherein the codec class is arranged to classify the performance of a codec configured to encode or decode data in a specific predetermined media format, and the codec level serves as a group of one or more codec classes, each class in the codec level having upward compatibility with the other classes in the same codec level, the codec class and the codec level being based on stipulated specifications; and
   a recording control step arranged to record said coded data encoded in said encoding step in a recording medium as a file, wherein the codec level of said coded data is represented in a portion of the file name other than the suffix or extension of the file name.

8. A playback apparatus configured to play data employing a coding method arranged to encode or decode data said apparatus comprising:
   decoding means configured to decode coded data encoded with a predetermined codec class within a predetermined codec level with said predetermined coding method, and also enable coded data of a codec class having compatibility with said predetermined codec class to be decoded, wherein the codec class is arranged to classify the performance of a codec configured to encode or decode data in a specific predetermined media format, and the codec level serves as a group of one or more codec classes, each class in the codec level having upward compatibility with the other classes in the same codec level, the codec class and the codec level being based on stipulated specifications;
   codec-level determining means configured to determine the file of coded data of said predetermined codec level with which said decoding means are compatible based on a file name from files wherein the coded data of an optional codec class within an optional codec level is recorded in a recording medium as a file, wherein the codec level of the coded data is represented in a portion of the file name other than the suffix or extension of the file name; and
   codec-class determining means configured to determine the file of coded data of a codec class which said decoding means can decode from files of coded data of said predetermined codec level with which said decoding means are compatible.

9. The playback apparatus according to claim 8, wherein with said recording medium, in a directory whose directory name represents a coding method, the file of coded data of a codec class within a codec level by which the coding method thereof is stipulated is recorded;
   and wherein of files recorded in said recording medium, said codec-level determining means determine the file of coded data of said predetermined codec level with which said decoding means are compatible based on a file name from files recorded in a directory whose directory name represents a coding method to which said decoding means correspond.

10. The playback apparatus according to claim 8, wherein said coded data, and class information serving as the information of the codec class of the decoded data thereof are recorded in said recording medium;
    and wherein said codec-class determining means determine the file of coded data of a codec class which said decoding means can decode based on said class information recorded in said recording medium.

11. The playback apparatus according to claim 10, wherein the class information of each of one or more pieces of said coded data is recorded in said recording medium;
    and wherein said codec-class determining means determine the file of coded data of a codec class which said decoding means can decode based on said class information recorded in said one file.

12. The playback apparatus according to claim 8, further comprising:
    display control means configured to display a list of files of coded data of a codec class which said decoding means can decode, within said predetermined codec level with which said decoding means are compatible.

13. The playback apparatus according to claim 8, further comprising:
    display control means configured to display a list of files within an optional directory recorded in said recording medium.

14. The playback apparatus according to claim 8, wherein said recording medium records, the file of coded data of in a directory whose directory name represents a coding method, the coded data having a codec class within a codec level by which the coding method thereof is stipulated;

said playback apparatus further comprising:
display control means configured to display a list of files recorded in a directory whose directory name represents a coding method with which said decoding means are compatible by distinguishing between the file of coded data of a codec class which said decoding means can decode, within said predetermined codec level with which said decoding means are compatible, and the other files.

15. A playback method arranged to play data employing a coding method arranged to encode or decode data said method comprising:
a decoding step arranged to cause decoding means to decode coded data, which are configured to decode coded data encoded with a predetermined codec class within a predetermined codec level with said predetermined coding method, and also enable coded data of a codec class having compatibility with said predetermined codec class to be decoded, wherein the codec class is arranged to classify the performance of a codec configured to encode or decode data in a specific predetermined media format, and the codec level serves as a group of one or more codec classes, each class in the codec level having upward compatibility with the other classes in the same codec level, the codec class and the codec level being based on stipulated specifications;
a codec-level determining step arranged to determine the file of coded data of said predetermined codec level with which said decoding means are compatible based on a file name from files wherein the coded data of an optional codec class within an optional codec level is recorded in a recording medium as a file, wherein codec level of the coded data is represented in a portion of the file name other than the suffix or extension of the file name; and
a codec-class determining step arranged to determine the file of coded data of a codec class which said decoding means can decode from files of coded data of said predetermined codec level with which said decoding means are compatible.

16. A non-transitory computer readable storage medium containing instructions that cause a processor to execute playback processing wherein data is played, employing a coding method arranged to encode or decode data, said method comprising:
a decoding step arranged to cause decoding means to decode coded data, which are configured to decode coded data encoded with a predetermined codec class within a predetermined codec level with said predetermined coding method, and also enable coded data of a codec class having compatibility with said predetermined codec class to be decoded, wherein the codec class is arranged to classify the performance of a codec configured to encode or decode data in a specific predetermined media format, and the codec level serves as a group of one or more codec classes, each class in the codec level having upward compatibility with the other classes in the same codec level, the codec class and the codec level being based on stipulated specifications;
a codec-level determining step arranged to determine the file of coded data of said predetermined codec level with which said decoding means are compatible based on a file name from files wherein the coded data of an optional codec class within an optional codec level is recorded in a recording medium as a file, wherein the codec level of the coded data is represented in a portion of the file name other than the suffix or extension of the file name; and
a codec-class determining step arranged to determine the file of coded data of a codec class which said decoding means can decode from files of coded data of said predetermined codec level with which said decoding means are compatible.

17. A recording/playback apparatus configured to perform recording and playback of data employing a coding method arranged to encode or decode data, said apparatus comprising:
codec means configured to encode data into coded data of a predetermined codec class within a predetermined codec level with said predetermined coding method, and also decode said coded data, and also enable coded data of a codec class having compatibility with said predetermined codec class to be decoded, wherein the codec class is arranged to classify the performance of a codec configured to encode or decode data in a specific predetermined media format, and the codec level serves as a group of one or more codec classes, each class in the codec level having upward compatibility with the other classes in the same codec level, the codec class and the codec level being based on stipulated specifications;
recording control means configured to record said coded data encoded by said codec means in a recording medium as a file, wherein the codec level of the coded data is represented in a portion of the file name other than the suffix or extension of the file name;
codec-level determining means configured to determine the file of coded data of said predetermined codec level with which said decoding means are compatible based on a file name from files recorded in said recording medium; and
codec-class determining means configured to determine the file of coded data of a codec class which said codec means can decode from files of coded data of said predetermined codec level with which said codec means are compatible.

18. A recording/playback method arranged to perform recording and playback of data employing a coding method arranged to encode or decode data, said method comprising:
a coding step arranged to cause codec means to encode data into coded data of a predetermined codec class within a predetermined codec level with said predetermined coding method, and also decode said coded data, and also enable coded data of a codec class having compatibility with said predetermined codec class to be decoded, wherein the codec class is arranged to classify the performance of a codec configured to encode or decode data in a specific predetermined media format, and the codec level serves as a group of one or more codec classes, each class in the codec level having upward compatibility with the other classes in the same codec level, the codec class and the codec level being based on stipulated specifications;
a recording control step arranged to record said coded data encoded by said codec means in a recording medium as a file, wherein the codec level of the coded data thereof is represented in a portion of the file name other than the suffix or extension of the file name;
a codec-level determining step arranged to determine the file of coded data of said predetermined codec level with which said codec means are compatible based on a file name from files recorded in said recording medium; and a codec-class determining step arranged to determine the file of coded data of a codec class which said codec means can decode from files of coded data of said predetermined codec level with which said codec means are compatible.

19. A non-transitory computer readable storage medium containing instructions that cause a ewer processor to execute recording playback processing wherein recording and playback of data is performed, employing a coding method arranged to encode or decode data, said method comprising:

a coding step arranged to cause codec means to encode data into coded data of a predetermined codec class within a predetermined codec level with said predetermined coding method, and also decode said coded data, and also enable coded data of a codec class having compatibility with said predetermined codec class to be decoded, wherein the codec class is arranged to classify the performance of a codec configured to encode or decode data in a specific predetermined media format, and the codec level serves as a group of one or more codec classes, each class in the codec level having upward compatibility with the other classes in the same codec level, the codec class and the codec level being based on stipulated specifications;

a recording control step arranged to record said coded data encoded by said codec means in a recording medium as a file, wherein the codec level of the coded data is represented in a portion of the file name other than the suffix or extension of the file name;

a codec-level determining step arranged to determine the file of coded data of said predetermined codec level with which said codec means are compatible based on a file name from files recorded in said recording medium; and a codec-class determining step arranged to determine the file of coded data of a codec class which said codec means can decode from files of coded data of said predetermined codec level with which said codec means are compatible.

* * * * *